US010509909B2

(12) United States Patent
Andriani

(10) Patent No.: US 10,509,909 B2
(45) Date of Patent: Dec. 17, 2019

(54) NON-DISRUPTIVE DDOS TESTING

(71) Applicant: MazeBolt Technologies Ltd., Ramat Gan (IL)

(72) Inventor: Matthew Andriani, Givatayim (IL)

(73) Assignee: MAZEBOLT TECHNOLOGIES LTD., Ramat Gan (IL)

( * ) Notice: Subject to any disclaimer, the term of this patent is extended or adjusted under 35 U.S.C. 154(b) by 347 days.

(21) Appl. No.: 15/501,863

(22) PCT Filed: Sep. 3, 2015

(86) PCT No.: PCT/IL2015/050890
§ 371 (c)(1),
(2) Date: Feb. 6, 2017

(87) PCT Pub. No.: WO2016/035083
PCT Pub. Date: Mar. 10, 2016

(65) Prior Publication Data
US 2018/0046811 A1 Feb. 15, 2018

Related U.S. Application Data

(60) Provisional application No. 62/046,929, filed on Sep. 6, 2014, provisional application No. 62/183,561, filed on Jun. 23, 2015.

(51) Int. Cl.
*G06F 21/57* (2013.01)
*H04L 29/06* (2006.01)
(Continued)

(52) U.S. Cl.
CPC ............ *G06F 21/577* (2013.01); *G06F 21/55* (2013.01); *H04L 43/062* (2013.01);
(Continued)

(58) Field of Classification Search
CPC ... G06F 21/577; G06F 21/55; H04L 63/1433; H04L 63/1425; H04L 63/1458; H04L 43/062
See application file for complete search history.

(56) References Cited

U.S. PATENT DOCUMENTS 9,497,207 B2 * 11/2016 Dhawan ............. H04L 63/1441
2006/0218640 A1 * 9/2006 Lotem ................... G06F 21/577
726/25

(Continued)

OTHER PUBLICATIONS

Feinstein et al. "Statistical Approaches to DDoS Attack Detection and response." in: DARPA Information Survivability Conference and Exposition. Apr. 24, 2003 (Apr. 24, 2003).

(Continued)

*Primary Examiner* — Joseph P Hirl
*Assistant Examiner* — Thomas A Gyorfi
(74) *Attorney, Agent, or Firm* — Mark M. Friedman

(57) ABSTRACT

DDoS testing service features testing and verifying the integrity of a DDoS mitigation strategy of an organization while maintaining operation of the targeted organization's IT infrastructure. This facilitates ongoing and recurring operation and integrity of the DDoS mitigation strategy, at regular intervals and without causing service disruption to the IT infrastructure. Testing can include an array of DDoS attack vectors allowing the risk assessment of the organization to be fully visible for the production environment concerning successful DDoS attack being launched against the organization.

28 Claims, 6 Drawing Sheets

(51) Int. Cl.
  *H04L 12/26*  (2006.01)
  *G06F 21/55*  (2013.01)
(52) U.S. Cl.
  CPC ...... *H04L 63/1425* (2013.01); *H04L 63/1433* (2013.01); *H04L 63/1458* (2013.01)

(56) References Cited

U.S. PATENT DOCUMENTS

| | | |
|---|---|---|
| 2007/0130619 A1 | 6/2007 | Reams, III |
| 2008/0034424 A1* | 2/2008 | Overcash ............... G06F 21/55 726/22 |
| 2008/0098479 A1 | 4/2008 | O'Rourke et al. |
| 2009/0172813 A1 | 7/2009 | Aaron |
| 2011/0288692 A1 | 11/2011 | Scott |
| 2012/0151593 A1 | 6/2012 | Kang et al. |
| 2012/0216282 A1 | 8/2012 | Pappu et al. |
| 2013/0091573 A1 | 4/2013 | Herz et al. |
| 2016/0028764 A1* | 1/2016 | Vasseur ............... H04L 63/1458 726/23 |

OTHER PUBLICATIONS

Schmidt et al. "A distributed denial of service testbed." Aug. 8, 2014 (Aug. 8, 2014).

Hardaker et al. "Justification and Requirements for a National DDoS Defense Technology Evaluation Facility." Jul. 26, 2002 (Jul. 26, 2002).

\* cited by examiner

NON-DISRUPTIVE DDOS TESTING

FIELD OF THE INVENTION

The present invention generally relates to communications, and in particular, it concerns network testing.

BACKGROUND OF THE INVENTION

Distributed denial of service (DDoS) attacks are now a major threat to all financial institutions, e-commerce businesses, as well as governments. DDoS attacks can take down stock exchanges, voting sites, as well as other critical online infrastructure. Many organizations are investing larger sums of their capital to mitigate this devastating attack vector.

Though currently most of a company's budget is applied to the mitigation systems themselves, validating the DDoS mitigation systems deployed in an organization is becoming a necessity. Similar to the way in the 1990's that firewalls were deployed, next IPS device, and WAF devices, organizations then wanted to verify these systems actually do what the systems were relied upon to do, that is protect their network from being hacked into. The phrases "pentesting" (penetration test) and "vulnerability scanning" became synonymous with every organization's cyber security program for protecting their network against malicious infiltration.

The same logic applies to current DDoS simulation testing. Organizations like stock exchanges, banks, governments etc. cannot afford to have downtime without having significant financial and public relations damage. Companies should have ongoing DDoS tests run against the company's environment to ensure security. However, because of time constraints involved with current testing methodologies only a fraction of tests are performed with disruptive testing.

Currently, conventional "DDoS testing systems" and methodologies offered commercially as a service or by security consultants are disruptive to the IT infrastructure of the organization targeted for the DDoS test simulation. This requires that a maintenance period usually needs to be organized within the company or as a substitute the DDoS simulation is performed against a staging environment (in order to prevent any downtime), which is often not an exact replica of the production environment. This also means conventional tests are more a "one-off" DDoS test simulation. Even in companies who do conventional DDoS testing diligently, they do not perform such testing more than once a quarter because of the associated logistics setting up maintenance periods for the testing.

The drawback of a one-off disruptive DDoS test every quarter or a couple of times a year, is that besides the fact that a maintenance window is needed and will likely have service downtime, the DDoS test only verifies the system for that exact point in time, leaving large gaps in an organizations cyber security posture.

Currently, DDoS tests that validate DDoS mitigation systems, or the service reliability of an organization with regards to DDoS attacks, are done with systems, platforms or tools that launch large volumes of traffic or specific application layer traffic from one or more nodes or agents from one or more locations around the world (mainly on the internet) against the organization receiving the DDoS test simulation. The attacks are designed to disrupt and attempt to affect the organization's service availability. The DDoS test traffic aims to disrupt service availability or see the upper limits of what the organization can withstand in terms of their deployed IT infrastructure. Current tests verify how many "packets per second", "connections per second", "megabits per second" or malicious quantities of traffic the organization can withstand until service availability is affected. This type of conventional testing is extremely disruptive to ongoing service availability. This disruption deters some organizations from performing such tests. However, this testing may be required by regulations and/or law.

In disruptive style DDoS tests, more than one test (and therefore maintenance period) is necessary because configuration issues may have been overlooked or obvious flaws with current mitigation systems unknown. This causes the infrastructure to be negatively affected during the test at which point all IT staff prefer to bring the test to an end (especially if working on production systems) until the causes are better understood and assumed reasons for the infrastructure failure resolved. Another test is run and this iterative process repeated. Had these configuration issues and flaws been known before hand, all the disruption to the production environment and internal staff logistics of the organization being tested could have been greatly reduced. Also, significantly more attack vectors can be verified during disruptive DDoS testing if you previously have run the non-disruptive DDoS testing proposed.

Another clear issue with disruptive DDoS testing is the fact that only a limited amount of tests can be run during a specific maintenance window, for example per hour up to a dozen DDoS tests may be able to be run, at best. This means that to test hundreds of DDoS scenarios against potentially thousands of targets would take many thousands of cumulative man-hours for the organization. As a result, currently only a small subset of potential DDoS attack vectors are checked and verified against a small subset of targets. The reason being is resource allocation for staff and budget for testing on that level is not realistic for most organizations. This approach unfortunately in reality weakens the organization's resilience to a determined and sustained DDoS attack. This was clearly demonstrated during recent attacks on US banks. Recent attacks showed major flaws in defenses of even the most well funded and supposedly best-protected organizations. There are still many flaws that remain in the same organizations targeted previously and these organizations would benefit from ironing out current infrastructure and mitigation weaknesses with regards to DDoS attacks. Though in practice to refine their DDoS mitigation strategy is an increasingly complex and costly task.

With DDoS attacks becoming a more and more common cyber security attack vector, organizations want to make sure that services (CPE/Scrubbing) and strategies deployed are able to withstand an actual DDoS attack. The main objective of a DDoS attack is to take down the targeted organization, but can also lead to more targeted attacks for data theft. DDoS attacks can kill stateful devices which normally protect otherwise vulnerable services (for example, firewalls or WAF's).

SUMMARY

According to the teachings of the present embodiment there is provided a method for testing including the steps of: configuring a coordination device on a production network, the coordination device emulating at least one network service and the production network protected by a distributed denial of service (DDoS) mitigation module; receiving, by the coordination device, pre-attack notification information; and collecting, by the coordination device, operation data regarding the operation of the coordination device, the collecting based on the pre-attack notification information, and the collecting during an attack based on the pre-attack notification information.

In an optional embodiment, the method includes the steps of monitoring the operation data during the attack; and if the monitoring determines that the operation data is out of a pre-determined range, initiating notification to alter or terminate the attack.

In another optional embodiment, the method includes the steps of generating attack results data based on the collecting; sending the attack results data; and evaluating the attack results data to determine the effectiveness of the DDoS mitigation module. In another optional embodiment, the sending occurs during one or more times selected from the group consisting of: during the collecting; and after the collecting.

In another optional embodiment, the coordination device is further configured on a mirror port of the production network to receive a copy of network traffic destined for devices on the production network other than the coordination device. In another optional embodiment, prior to the step of collecting, generating a baseline of normal response for the at least one network service. In another optional embodiment, the prior to the step of collecting, verifying stability of the production network.

In another optional embodiment, the pre-attack notification information includes one or more types of attacks to be launched, when each type of attack will be launched, and parameters of each type of attack.

In another optional embodiment, the method includes the step of: configuring one or more coordination agents on one or more devices on the production network, wherein the coordination agents are configured for: receiving the pre-attack notification information; collecting agent operation data regarding the operation of the respective one or more devices on which the coordination agent is configured, the collecting based on the pre-attack notification information, and the collecting during the attack; generating agent attack results data based on the collecting; and sending the agent attack results data. In another optional embodiment, the receiving and the sending by the coordination agents are with a device selected from the group consisting of: the coordination device; a monitor; and a monitor controller.

In another optional embodiment, the method includes the steps of monitoring the agent operation data during the attack; and if the monitoring determines that the agent operation data is out of a pre-determined range, initiating notification to alter or terminate the attack.

In another optional embodiment, the method includes the step of: configuring one or more monitor devices on an external network, the external network other than the production network, wherein the monitor devices are configured for: receiving the pre-attack notification information; collecting monitor operation data from a source selected from the group consisting of: one or more devices on the production network; and one or more network services on the production network, the collecting based on the pre-attack notification information, and the collecting during the attack, generating monitor attack results data based on the collecting; and sending the monitor attack results data.

In another optional embodiment, the method includes the steps of monitoring the monitor operation data during the attack; and if the monitoring determines that the monitor operation data is out of a pre-determined range, initiating notification to alter or terminate the attack.

In another optional embodiment, the attack is initiated by a monitor controller device in communication with a simulator controller, and if the simulator controller loses communication with the monitor controller then the simulator controller initiates notification to terminate the attack.

In another optional embodiment, the attack is initiated by the simulator controller to be performed by one or more simulators, and if any of the simulators loses communication with the simulator controller then the simulator that has lost communication terminates performing the attack.

According to the teachings of the present embodiment there is provided a system for testing including: a coordination device emulating at least one network service, and configured to: receive pre-attack notification information; and collect operation data regarding the operation of the coordination device, wherein the collecting is based on the pre-attack notification information, and the collecting is during an attack based on the pre-attack notification information.

In an optional embodiment, the coordination device is configured on a production network; and the production network is protected by a distributed denial of service (DDoS) mitigation module.

In another optional embodiment, the coordination device is further configured to: monitor the operation data during the attack; and if the monitoring determines that the operation data is out of a pre-determined range, initiating notification to alter or terminate the attack.

In another optional embodiment, the coordination device is further configured to: generate attack results data based on the collecting; send the attack results data; and evaluate the attack results data to determine the effectiveness of the DDoS mitigation module, wherein the sending occurs during one or more times selected from the group consisting of: during the collecting; and after the collecting.

In another optional embodiment, the coordination device is further configured to prior to the collecting, generate a baseline of normal response for the at least one network service; and prior to the collecting, verify stability of the production network.

In another optional embodiment, the production network includes one or more devices; and at least one of the one or more devices is configured with one or more coordination agents operable to: receive the pre-attack notification information; collect agent operation data regarding the operation of the respective one or more devices on which the coordination agent is configured, the collecting based on the pre-attack notification information, and the collecting during the attack; generate agent attack results data based on the collecting; and send the agent attack results data.

In another optional embodiment, the one or more coordination agents are further operable to monitor the agent operation data during the attack; and if the monitoring determines that the agent operation data is out of a pre-determined range, initiating notification to alter or terminate the attack.

In another optional embodiment, the system further includes: an external network, the external network other than the production network, one or more monitor devices configured on the external network, wherein the monitor devices are operable to: receive the pre-attack notification information; collect monitor operation data from a source selected from the group consisting of: one or more devices on the production network; and one or more network services on the production network, the collecting based on the pre-attack notification information, and the collecting during the attack, generate monitor attack results data based on the collecting; and send the monitor attack results data.

In another optional embodiment, the monitor devices are further operable to monitor the monitor operation data during the attack; and if the monitoring determines that the monitor operation data is out of a pre-determined range, initiating notification to alter or terminate the attack.

In another optional embodiment, the system further includes a simulator controller; and a monitor controller in operational communication with the coordination device and the simulator controller, the monitor controller operational to: initiate the attack, and the simulator controller is operational: if the simulator controller loses communication with the monitor controller then the simulator controller initiates notification to terminate the attack.

In another optional embodiment, the attack is initiated by the simulator controller to be performed by one or more simulators, and if any of the simulators loses communication with the simulator controller, then the simulator that has lost communication terminates performing the attack.

According to the teachings of the present embodiment there is provided a non-transitory computer-readable storage medium having embedded thereon computer-readable code for testing, the computer-readable code including program code for: configuring a coordination device on a production network, the coordination device emulating at least one network service and the production network protected by a distributed denial of service (DDoS) mitigation module; receiving, by the coordination device, pre-attack notification information; and collecting, by the coordination device, operation data regarding the operation of the coordination device, the collecting based on the pre-attack notification information, and the collecting during an attack based on the pre-attack notification information.

According to the teachings of the present embodiment there is provided a computer program that can be loaded onto a server connected through a network to a client computer, so that the server running the computer program constitutes a coordination device in a system according to any one of the above claims.

BRIEF DESCRIPTION OF FIGURES

The embodiment is herein described, by way of example only, with reference to the accompanying drawings, wherein.

ABBREVIATIONS AND DEFINITIONS

Figure 1:
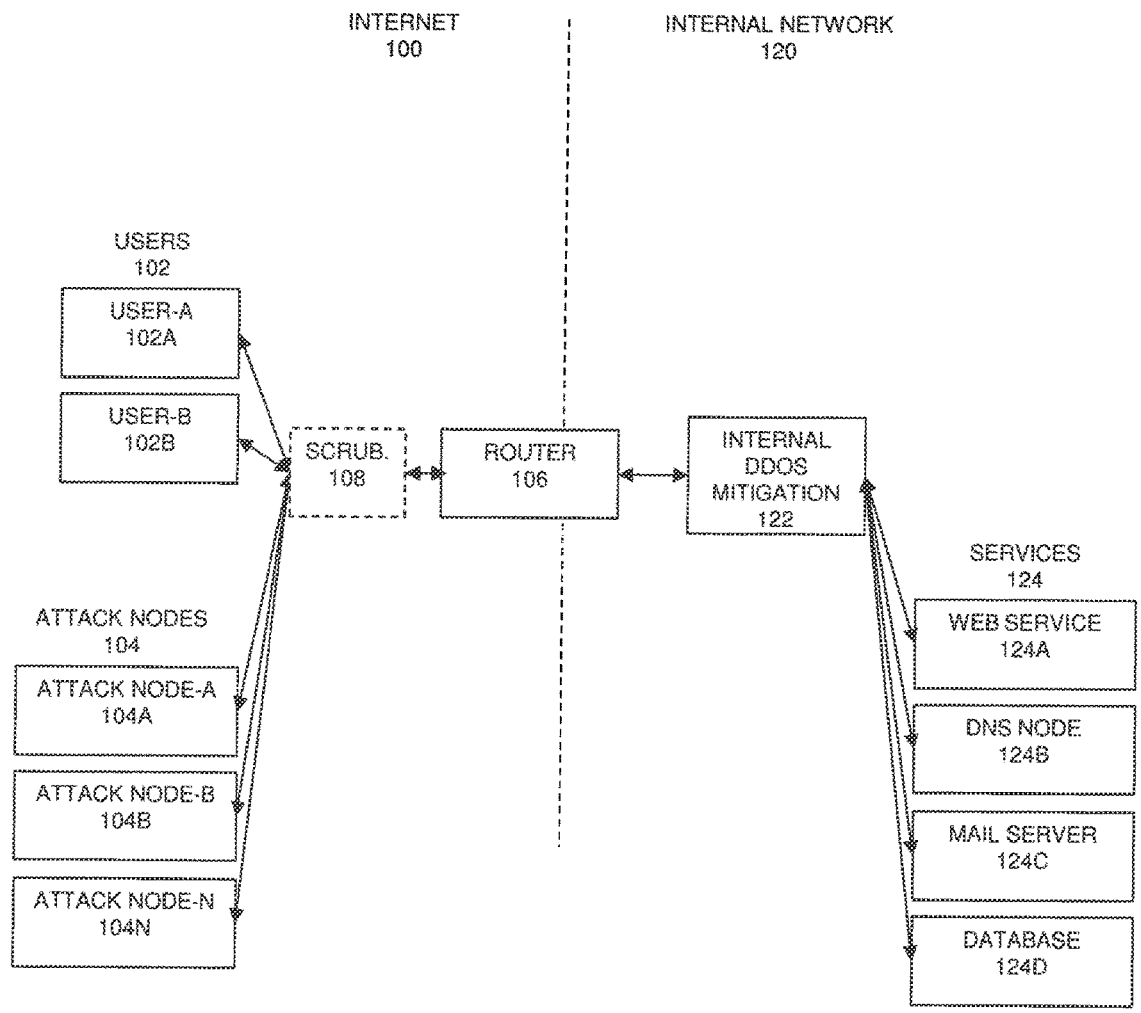
FIG. 1 is a high-level sketch of a conventional common network topology.

For convenience of reference, this section contains a brief list of abbreviations, acronyms, and short definitions used in this document. This section should not be considered limiting. Fuller descriptions can be found below, and in the applicable Standards.

BID—Security focus Bugtraq ID Database, tracks issues of cyber security flaws and exploits also sometimes corresponding fixes.

BGP—Border Gateway Protocol.

CPE—customer premises equipment.

CPS—Connections per second.

CVE—Common Vulnerabilities exposure provides a reference method for publically known information-security vulnerabilities and exposures.

Device—One skilled in the art will realize that the terms "device", "node", "server," and similar terms are generally used interchangeably as appropriate for the specific context of the hardware or module being referenced.

DoS—Denial of service. A type of attack attempting to make a machine or network resource (service or node) unavailable to intended users.

DDoS—Distributed Denial of service. A type of DoS attack where the attack source is more than one, and often a multitude (such as thousands) of unique IP addresses.

DMZ—De-militarized zone.

FQDN—Fully qualified domain name.

Internal network—an organization's production network, also referred to as a "production environment", or simply "environment". Normally a private network under control of the organization, as opposed to the public Internet.

IP—Internet protocol.

IPS device—Intrusion Prevention System—monitors network traffic and attempts to block and log malicious activity on a network.

IT—Information technology.

Port mirroring—sending a copy of network packets seen on one switch port to another switch port. Also known as a network tap, mirror port or Switched Port ANalyzer (SPAN) port.

PPS—Packets per second.

Pre-attack notification information—Information regarding what types of attacks will be launched against the production environment during an upcoming attack (testing). Also referred to in the context of this document as "pre-attack information". Pre-attack information should not be confused with conventional "attack" information that is generated by conventional computer defense systems during an attack. Pre-attack information should also not be confused with "attack" information that is generated and/or provided after an attack has occurred or after testing has completed.

Production environment—Generally the internal network of an organization including the production servers. Also referred to in this document as the overall "system" being tested, or system for which health and status is being determined.

Production servers—one or more servers (devices or nodes) typically on an organization's internal network. Each production server may be configured to run one or more services, and optionally run one or more coordination agents.

Scrubbing—A service external to an organization's (internal) network that is relied upon to only pass clean traffic to the organization's (internal) network, such as destination production servers. A scrubbing center may be relied upon in place of or in conjunction with CPE for DDoS mitigation upstream to mitigate some of the malicious (attack) traffic.

SIEM—Security Information and Event Management is a term for software products and services combining security information management (SIM) and security event management (SEM). SIEM technology provides real-time analysis of security alerts generated by network hardware and applications.

SIM—security information management.

Target—an element that is the subject of an attack. The object being attacked, towards which an attack is directed. For example, a target can be an organization in general, an organizations internal network (such as internal network 120), a server device (such as one or more of the production servers 126, such as web server 126A), or a service (such as one or more of the services 124, such as mail service 124C).

Testing—In the context of this document, "DDoS testing" is also referred to as "testing", an "attack", or a "DDoS attack".

TCP—Transmission Control Protocol provides reliable communication with handshaking (often referred to as three-way handshake) over IP networks. TCP is a reliable transmission method and is sometimes referred to as TCP/IP. TCP is the transport protocol used with may services today such as HTTP or FTP.

UDP—User Datagram Protocol is a major part of the IP suit of protocols. UDP is referred to as unreliable or connectionless since UDP does not have handshaking and other error/reliability checking features built-in. UDP is utilized in many services today, for example DNS.

WAF (Web Application Firewall)—A device dedicated to mitigating web based attack vectors. WAFs, unlike firewalls, are designed mainly to inspect the application layer (layer 7) of incoming traffic. WAFs apply a set of rules to HTTP traffic dynamically or statically to stop an attack (for example XSS, SQL injections).

Examples of DDoS attacks, include, but are not limited to:
SYN flood
ACK Flood
RST Flood
LOIC (Low Orbit Iron Cannon)
HOIC (High Orbit Iron Cannon)
Out of state flood
Slowloris
R.U.D.Y
Slow HTTP test
ICMP flood
Teardrop attacks
Slow rate flood
HTTP POST flood
HTTP GET Flood
Dynamic HTTP flood
DNS request flood
SSL renegotiation attack
Bypass Layer 7 protections
DNS response Flood
NTP attack
SIP renegotiation attack
Advanced persistent DDoS (APT DDoS attacks)

Equipment that can be used as part of a DDoS mitigation strategy, such as being integrated as sub-modules in the DDoS mitigation 230 include, but are not limited to:
Correros DDoS Defense Device—http://www.corero.com/products/Corero_DDS.html
Radwares Defense Pro—http://www.radware.com/Products/DefensePro/
F5 DDoS mitigation devices—http://www.f5.com/it-management/solutions/ddos-protection/overview/

Scrubbing centers can include, but are not limited to equipment such as:
Arbour—http://www.arbornetworks.com/products/arbor-cloud/for-enterprises
Prolexic—http://www.prolexic.com/services-dos-and-ddos-mitigation.html
Incapsula—http://www.incapsula.com/ddos-protection-services.html Firewalls can include, but are not limited to:
Checkpoint—http://www.checkpoint.com/products/next-generation-firewall/index.html
Fortinet—http://www.fortinet.com/solutions/firewall.html IPS/IDS systems include, but are not limited to:
Snort—https://www.snort.org/
Cisco IPS—http://www.cisco.com/c/en/us/products/collateral/security/ips-4200-series-sensors/product_data_sheet0900aecd805baef2.html
Fortinet IPS—http://www.fortinet.com/solutions/ips.html
IBM IPS—http://www-03.ibm.com/software/products/en/network-ips
Source fire—http://www.sourcefire.com/products/next-generation-network-security Routers include, but are not limited to:
Cisco—http://www.cisco.com/c/en/us/products/routers/index.html
Juniper—http://www.juniper.net/us/en/products-services/routing/

WAF (Web application firewall) include, but are not limited to:
Imperva—http://www.imperva.com/Products/WebApplicationFirewall
Radware—http://www.radware.com/Products/AppWall/

The above are just some of the more common devices seen in a network with regards to mitigating and defending against cyber security threats.

DDoS is unique in the fact that DDoS often requires more than one of these devices or infrastructures to be incorporated into the DDoS mitigation strategy to stop a DDoS attack from impacting service availability. For example, perhaps the DDoS mitigation device on the network has no ability to block a specific geographical range of IP's during a DDoS attack. The administrator understands the attack comes from a specific country but has no way to block that entire range of IPs with the DDoS mitigation device. However, geographic blocking may be possible on the deployed firewall of the organization, a rule to block an entire range of IPs could then be added to the firewall to mitigate the DDoS attack. In this example, the DDoS attack was mitigated with the firewall and not the DDoS mitigation system.

Disruptive DDoS testing—implies that launching of the DDoS attack simulations against an organization's IT infrastructure will cause disruption to service availability if that particular attack vector is not mitigated by the DDoS mitigation systems deployed. For example: If a website is being tested for susceptibility to DDoS attacks, and a disruptive DDoS attack is performed towards the website, if the website is not as protected against such an attack vector, visitors will no longer be able to connect to the website. Service availability has been disrupted. To further this example, if the website was hosted on a network that also hosts a mail server, the mail server may also become unavailable, even if the original target was just the web server.

Non-Disruptive DDoS testing—implies that the DDoS testing taking place against the IT infrastructure does not affect adversely any of the service availability of the organization being tested. All services should remain in a healthy state for external users to utilize. For example: If a website is being tested for susceptibility to DDoS attacks and non-disruptive DDoS testing is used to verify if the website is indeed protected against multiple DDoS attack vectors, visitors should still be able to connect to the website. Service availability has not been disrupted. All services within that same subnet (network) such as SMTP or FTP would also not be disrupted (continue to operate).

Network services—Also referred to as "services" such as the services 124 or "production services", include any service (also referred to as daemons) that are designed and deployed to serve users. Some examples of common services include, but are but not limited to:
  HTTP service—Serves websites and other web based applications (APACHE and IIS are a couple of common web services)
  SMTP—Is a mail protocol used to send email (POSFIX and Exchange may implement SMTP)
  SIP—Use for VOIP communications.

IT infrastructure (network infrastructure)—refers to a device that has traffic passed through the device on the IT network of an organization. Examples include, but are not limited to:
  Firewalls
  Routers
  DDoS mitigation devices
  WAF's (Web application firewalls)
  IPS (Intrusion prevention systems)
  Load balancers

DETAILED DESCRIPTION—FIGS. 1 TO 8

The principles and operation of the system according to a present embodiment may be better understood with reference to the drawings and the accompanying description. A present invention is a system for testing and verifying the integrity of a DDoS mitigation strategy of an organization while maintaining operation of the targeted organization's IT infrastructure. The method of the DDoS testing service facilitates ongoing and recurring operation and integrity of the DDoS mitigation strategy, at regular intervals and without causing service disruption to the IT infrastructure, thus removing the need for disruptive maintenance windows in organizations. A feature of this DDoS testing service is non-disruptive DDoS testing simulation for production environments, including checking all vectors of an organization's DDoS mitigation strategy in an ongoing way.

For simplicity, this description refers to DDoS attacks. This use should not be interpreted as limiting, and also applies to other types of attacks, such as DoS attacks.

In general, a method for testing includes deploying a coordination device (MB device) on a production network. The coordination device emulates at least one network service. The production network is protected by a distributed denial of service (DDoS) mitigation module. A baseline is generated of the production network's normal operation. Before DDoS testing, the coordination device receives pre-attack notification information. The pre-attack notification information includes one or more types of attacks to be launched, when each type of attack will be launched, and parameters of each type of attack. During an attack, the coordination device collects operation data based on the pre-attack notification information. The collected operation data is monitored during an attack, and if the monitoring determines that the operation data is out of a pre-determined range, the attack is altered or terminated.

The receiving of pre-attack information is a key feature of the DDoS testing service. In addition, monitoring during testing facilitates altering test execution, or terminating test execution (prior to the designated test ending time in the pre-attack information), thus facilitating non-disruptive testing of live, current production environments. Pre-attack information can include a variety of information as detailed elsewhere in this document. Pre-attack information normally includes at least a start time and an end time of the attack. One skilled in the art will realize that to insure proper operation of the system, all devices should use the same time reference (for example, all devices use UTC). All pre-attack notification information that is relevant for a device will be sent to the device. For example, if the coordination device 220 receives a complete set of pre-attack information, the coordination device 220 may optionally parse the complete pre-attack information and send only a subset of the complete pre-attack information as the pre-attack information for respectively one of the coordination agents 222.

One skilled in the art will realize that collection (gathering) of operation data includes, but is not limited to, measuring of operational parameters of a device and/or receiving operational information regarding a device, such as load, processes running, memory use, etc.

A "pre-determined range" refers to any one or more, or a combination of many parameters (operational parameters) of a device that are measured as part of the collection of operation data being at, above, or below a pre-determined value, or inside or outside a pre-determined range.

Referring now to the drawings, FIG. 1, a high-level sketch of a conventional common network topology. An external network, such as Internet 100 is connected via a router 106 to an internal network 120. Users 102 (for example user-A 102A and user-B 102B) desire to connect to and use services 124 such as exemplary web service 124A, DNS node 124B, mail service 124C, and database 124D. A denial of service (DoS) or distributed denial of service (DDoS) attack can be launched from one or more attack nodes 104 (for example attack node-A 104A, attack node-B 104B, up to attack node-N 104N). DDoS mitigation 122 is typically deployed after router 106 on the internal network 120 to protect services 124. Optionally, one or more scrubbing centers such as exemplary scrubbing center 108 can also be used as part of an organization's DDoS mitigation strategy. Internal network 120 represents the targeted organization's IT infrastructure, and is also referred to in the context of this document as the "organization's network" or "network at the organization". One skilled in the art will realize that for simplicity, the term "internal network" can include a variety of physical implementation and architectures, including but not limited to one or more subnets and additional networks co-located or in physically diverse locations.

Figure 2:
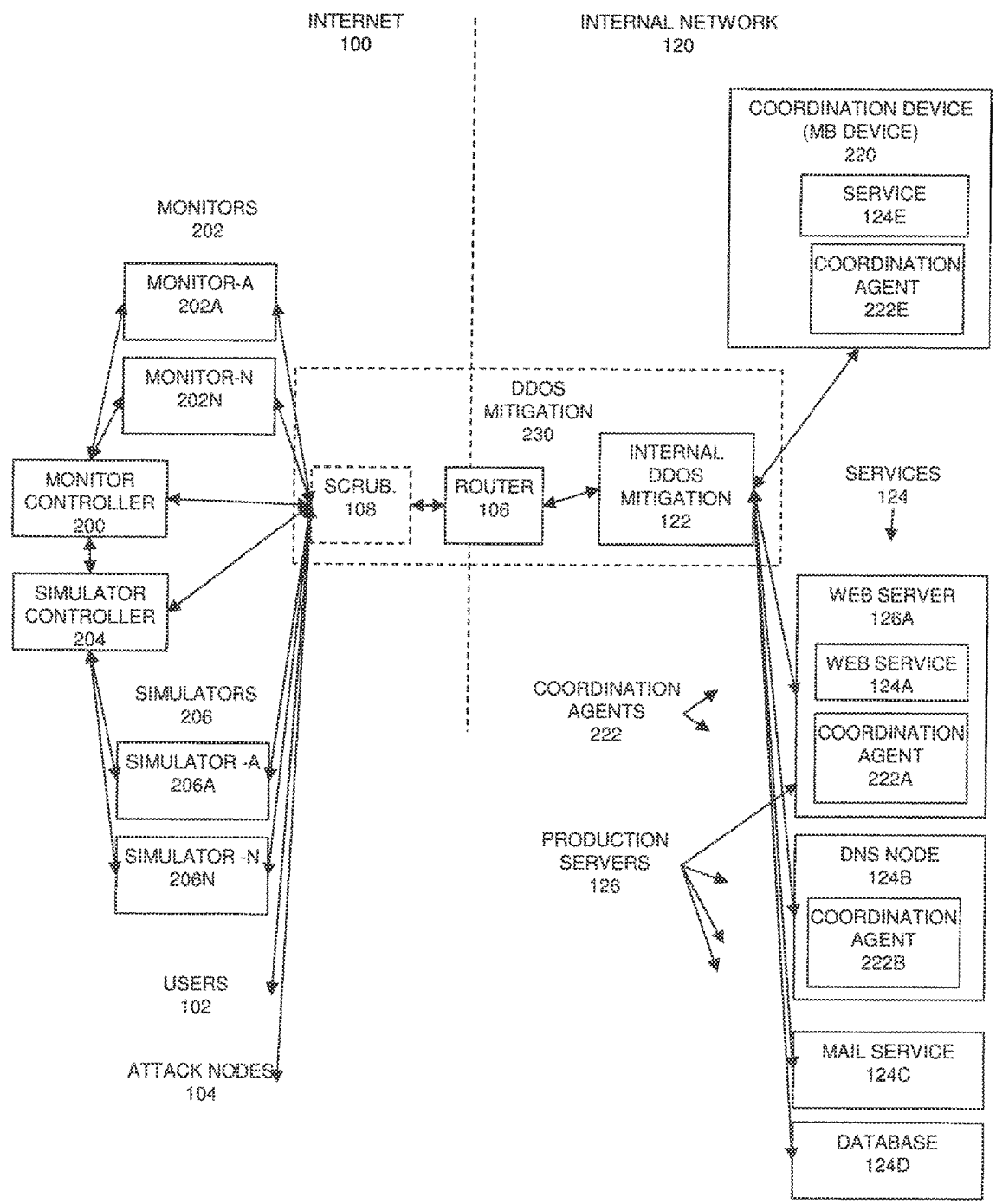
FIG. 2 is a diagram of a high-level network topology for a DDoS testing service.

Refer now to FIG. 2, a diagram of a high level network topology for a DDoS testing service for testing and verifying the integrity of a DDoS mitigation strategy of an organization while maintaining operation of the targeted organization's IT infrastructure. A DDoS mitigation module 230 is deployed. The DDoS mitigation module can contain one or more modules (sub-modules), such as scrubbing center 108, router 106, and internal (on premise) DDoS mitigation device 122.

The DDoS mitigation module 230 protects internal network 120 (an organization's production network). In the context of this document, the term "DDoS mitigation" 230 is also referred to as "DDoS mitigation module" and generally a "mitigation module" and refers to any device or part of device which directly attempts to mitigate DDoS attacks.

The DDoS mitigation module can be implemented as one or more of hardware, software, on standalone devices, as one or more components of existing devices, such as scrubbing service 108, either alone or in combination. Components of the mitigation module can be activated or deactivated, additional components added, and components removed. Testing an internal network 120 without DDoS mitigation 230 (without protection) is a "trivial solution", or non-existent level of protection, including turning off the DDoS mitigation. In other words, the current embodiment will function with any level of DDoS mitigation protection, including the DDoS mitigation being zero (turned off, or not deployed). In other words, in a case where there is no DDoS mitigation deployed, the DDoS mitigation module can be considered to have zero modules. Thus, a lack of a mitigation capability can be considered a trivial solution where DDoS mitigation module 230 is an empty set of modules.

Note that for simplicity DDoS mitigation 230 is shown separate from scrubbing service 108, however, in general, DDoS mitigation 230 refers to the entire mitigation module capabilities including disparate hardware and deployments such as scrubbing service 108 on external Internet 100.

Preferably a coordination device (also referred to in the context of this document as an "MB device") 220 is also deployed on the internal network 120. In addition or alternatively to the coordination device 220, coordination agents 222 can be deployed on the internal network 120. Typically, coordination agents are deployed on devices providing services, for example coordination agent 222A on web server 126A with web service (HTTP) 124A, coordination agent 222B with DNS node 124B and coordination agent 222E with the coordination device 220. One or more of the services 124 typically run on one or more production servers 126. For clarity, most services 124 are drawn without the corresponding hardware on which the services 124 are running. Typically, coordination device 220 is configured with one or more services 124, such as exemplary service 124E.

One or more monitor controllers, typically a single monitor controller 200 controls one or more monitors 202, such as exemplary monitor-A 202A through monitor-N 202N. Alternatively, a single device such as monitor controller 200 can be configured to perform the functions of a monitor controller and monitors. Monitor controller 200 is in communication with (one or more) simulator controller 204. Typically, this communication is constant (such as using a "stay alive" or "heartbeat" signal as is known in the art) to insure the proper functioning of the DDoS testing service, in particular to help implement fail-safe procedures for maintaining stable operation of internal network 120 (the targeted organization's IT infrastructure) during non-disruptive DDoS testing. One or more simulator controllers, typically a single simulator controller 204 controls one or more simulators 206, such as exemplary simulator-A 206A through simulator-N 206N. Alternatively, a single device such as simulator controller 204 can be configured to perform the functions of a simulator controller 204 and simulators 206. Alternatively, a single device such as the monitor controller 200 can be configured to perform simultaneously the functions of the monitor controller 200, monitors 202, simulator controller 204, and simulators 206.

In the context of this document, the term "target" is generally used to refer to an element that is the subject of an attack. The object being attacked, towards which an attack is directed. For example, a target can be an organization in general, an organizations internal network (such as internal network 120), a server device (such as one or more of the production servers 126, such as web server 126A), or a service (such as one or more of the services 124, such as mail service 124C).

General Operation

Conventional DDoS testing systems and methodologies are disruptive to the IT infrastructure of the organization targeted for the DDoS test simulation. In contrast, embodiments of the current invention for a DDoS testing service feature verifying in an ongoing and recurring fashion, the integrity of the overall deployed DDoS mitigation strategy (DDoS mitigation 230) of an organization at regular intervals and without causing service disruption to the targeted organization's IT infrastructure. Methods of the current embodiment can be implemented vendor and device type neutral, considering the overall strategy utilized to prevent DDoS attacks.

Regardless of whether the customer uses a scrubbing center service (or similar third party services) or customer premises equipment (CPE) or a hybrid of both CPE and scrubbing centers, the DDoS testing service will assess at regular intervals (hourly or daily or weekly or custom), the integrity and effectiveness of an organization's currently deployed DDoS mitigation 230 system's ability to mitigate up to the latest DDoS attacks. This non-disruptive DDoS testing can be done without affecting service availability of the production IT infrastructure and service, while at the same time assessing the production system's risk to a successful DDoS attack.

In contrast to conventional DoS testing, embodiments of the DDoS testing service will not affect the organization's IT infrastructures service availability while performing the DDoS simulation towards an organization's internal network 120. Testing for system health can be toward a coordination device 220 in the internal network 120 and simultaneously toward actual production servers. Ongoing DDoS testing can be altered or terminated if the DDoS testing service detects deterioration of the health of the production system. This termination is a "fail safe" mechanism built in to the DDoS testing system to avoid disruption and downtime of the production network. This means that a maintenance window is not required on the part of the organization for DDoS testing. Verifying the DDoS mitigation structure of an organization in an ongoing fashion without any downtime to production is a desirable feature for modern communication networks and testing. Additionally, the results of non-disruptive DDoS testing can be used in subsequent conventional disruptive DDoS testing, so that the disruptive DDoS testing simulations will be more focused and efficient with a more predictable outcome.

Financial institutions (e.g. banks, Forex trading, stock exchanges), large e-commerce sites (auctions, gaming, gambling), governmental sites, ISP infrastructure, and other organizations that rely on respective businesses being online and the continuity, availability, and storing of sensitive data should have DDoS testing on a regular basis, to assure being secured against the most up to date DDoS attack vectors. Embodiments of the DDoS testing service facilitate ongoing DDoS testing and risk assessment in production environments. Practical ongoing and recurring non-disruptive testing is possible and significantly reduces the likelihood of DDoS attacks affecting the organization utilizing the ongoing DDoS testing service.

The method of the non-disruptive DDoS testing service allows testing of a production environment's susceptibility and likelihood to succumbing to various DDoS attack vectors. The verification and testing do not require and avoid causing downtime to the organization being tested. Realistic assessments can be generated as a result of testing, since the tests are run against the production environment and not a staging environment. The non-disruptive DDoS testing method allows covering (testing) a much larger quantity of attacks and targets performed against a production environment, as compared to conventional disruptive testing, since no maintenance windows are required for the non-disruptive DDoS testing service, i.e. the testing can be ongoing.

The DDoS testing service will assist personnel responsible for an organization's IT infrastructure security to know almost real-time if the organization is vulnerable to a newly evolved DDoS threat, closing a significant gap in intelligence on cyber weaknesses within the organization. Conventional DDoS testing may take a few months until the next maintenance period, significantly delaying the awareness of the cyber weakness detection, leaving the organization vulnerable to a DDoS attack. The DDoS testing system has fail-safe mechanisms built-in to ensure the production environment is not disrupted during testing. This allows for many times more targets to be validated and also many more DDoS attack types to be run against the production environment 120, as compared to conventional techniques. The DDoS testing system also provides an accurate decision making process for staff involved in planning a half yearly or quarterly disruptive DDoS test, since there are certain known weaknesses and known strengths within the DDoS mitigation system. Therefore, the disruptive testing can verify a much larger quantity of attacks in the maintenance period by structuring the disruptive test plan based on more likely attacks to affect the environment to the less likely attacks.

Features of the DDoS testing service include:

1. An automated method for ongoing "non-disruptive", "Ongoing DDoS testing" including:

a. Emulating all network services wishing to be tested on the coordination device 220 or devices on the internal network. This coordination device 220 is protected by the same DDoS mitigation policy and DDoS mitigation 230 devices protecting the organization's "production" servers, the coordination device 220 also resides within the production environment and has all network traffic destined for other servers 124 mirrored to the coordination device 220 (the coordination device 220 is typically placed on a mirror/span port/TAP port in the organization being checked).

b. Verifying that the production environment is currently stable prior to testing from monitor controller 200 statuses, as well as continually verifying health of the production network during testing; this is done by creating a baseline of normal response times for the actual services 124 or coordination device 220 being verified, these servers and services 124 are queried directly for response times by the monitors 202 and the baseline stored on the monitor controller 200 for decision making and analysis c. Launching a series of DDoS attacks towards the production environment's coordination device 220 from an external network, not towards the production servers, at first only pre-testing the coordination device 220. This pre-testing towards the coordination device 220 may determine if further testing towards other production services 124 should continue based on the outcome of the testing of the coordination device 220. The DDoS attacks vary from known attacks vectors as well as being designed to bypass known protection mechanisms like layer 7 challenges and behavioral algorithms. After validating the DDoS attack against the coordination device 220, the attack is then run against the real production server without causing disruption, though launching traffic directly to the production servers 124 is also an option. While running an attack without a preliminary pre-test towards the coordination device 220 is possible, preferably a pre-test first launches towards the coordination device 220 to further reduce the risk of downtime during non-disruptive DDoS testing. DDoS testing traffic launched from simulators 206 towards the production services 124 will be sniffed (gathered) by the coordination device 220, since all traffic generated by the simulators 206 towards the services 124 is monitored on a mirror port by the coordination device 220 (the coordination device 220 is configured on a mirror port of the internal network 120).

d. Send data gathered from the coordination device 220 or devices to the monitor controller 200. This is the data gathered from the DDoS attack simulation traffic sent by the simulators 206, towards the coordination device 220 or production servers 124 being monitored by the coordination device 220.

e. Stopping any DDoS traffic simulation coming from the simulators 206 if any of the production environment (internal network 120) is adversely affected i.e. in an unhealthy status received from the monitor controller 200. Actual production servers and the services 124 are monitored by the monitor controller 200, and the simulator controller 204 is updated with the real-time health status of the production services 124 or the coordination device 220 (with coordination agents 222 results 510 gathered from internal servers e.g. the web server 126A).

f. Based on the data received from the monitor controller 200 (which is updated regularly with various data gathered on the coordination device 220, the monitors 202 and the simulator controller 204), then the monitor controller 200 decides if there is a DDoS mitigation issue within the tested environment. For example, if 100 SYN packets are sent towards the coordination device 220 from one or more of the simulators 206, with destination port 80 and the coordination device 220 receives all 100 SYN packets we may conclude that the infrastructure is susceptible to SYN flood attacks. The coordination device 220 would also gather the DDoS testing traffic from the simulators 206 for DDoS tests directed towards the production servers 126A and or the services 124.

g. Coordination agents 222 deployed on production servers (such as the web server 126A) may also produce statistical baselines which are used to determine if a server is vulnerable to a particular DDoS attack or becoming unstable during a test. The coordination agents 222 report to the coordination device 220 and the coordination device 220 reports back to the monitor controller 200 in as close to real-time as possible. This allows the monitor controller 200 to make decisions about the production environment's (internal network 120) stability status. The monitor controller 200 may combine both the coordination agents 222 baselines and the monitor controller 200 baselines to decide if a health issue (vulnerable or not vulnerable) has been detected on the targeted production server (for example the web server 126A). For ease of understanding, one example may be that an HTTP flood is launched towards the web service 124A at 100 CPS (connections per second) for 5 seconds from the simulators 206. During the non-disruptive DDoS testing the monitor controller's 200 monitors 202 baseline for HTTP traffic may not have deviated from a healthy state, however the coordination agent 222A data gathered by the coordination device 220 and passed back to the monitor controller 200 may show that 500 current open TCP connections (in a TIME_WAIT state) are now open on the targeted server 126A and this is enough of a deviation from the previous normal healthy baseline to consider the web service 124A now unhealthy for the coordination agent 222A baseline. This means the HTTP Flood DDoS test attack did pass through the DDoS mitigation 230 equipment (i.e. not mitigated) but did not adversely affect the web service 124A for external users 102 wanting to utilize the web service 124A (i.e. users 102 could still connect without any delay to the website). However, in the decision making process on the monitor controller 200 the web service 124A may be concluded to be (depending on administrator defined settings) vulnerable to the HTTP Flood attack vector when the administrator of the system views the results through the reporting 516.

h. The entire system working together gives an administrator an immediate and real-time overview of how a DDoS attack passed through the system (even if all other DDoS defensive systems have failed). This feature with regards to DDoS attacks does not exist today. The key elements described in this document assist to provide a quick understanding of a real-time attack underway. Those key elements may include the coordination device 220, the coordination agents 222, and previously stored statistics/baselines from the monitor controller 200. This feature of knowing what is affected can be available via a user interface (UI or GUI) that shows how the stability of the internal network 120 has changed under a real DDoS attack from real attack nodes 104. This is possible, in part, by the monitors 202 continuously monitoring the production services 124 and the coordination device 220 continuously updating the monitor controller 200, in addition, the coordination agents 222 are monitoring the services 124 data and all this data is gathered and reported back to the monitor controller 200 via the coordination device 220, this means all currently affected services 124 that are unhealthy are seen in real-time. The gathered data can then be used by the monitor controller 200 (or another device) to make (calculate, generate, and/or infer) conclusions about affected services 124. In addition, previously identified DDoS weaknesses detected by the method described of non-disruptive DDoS testing (DDoS testing service) allow for speedier diagnosis and analysis when under real-time DDoS attack from real attackers 104, as compared to the amount of time necessary for diagnosis and analysis using conventional techniques.

2. Automatic rechecking of the environment:

a. If there are any configuration changes to DDoS mitigation 230, devices in the organization's internal network 120, or new IPs are detected on the internal network 120 (for example, from an IP/Port scan launched by the one of the monitors 202), this may trigger the monitor controller 200 to tell the simulator controller 204 to run a series of DDoS testing simulations.

b. Responses can also be read from traffic launched on the simulator nodes 206. This assists in further understanding DDoS mitigation capabilities deployed at the organization, this may include information such as which types of layer 4 or layer 7 protections triggered during a DDoS test. For example by reading responses during a SYN flood DDoS test the simulators 206 may be able to understand that SYN cookie protection has been triggered by parsing (reading) the returning SYN+ACK packet.

3. A method of automatic hardening of the environment post DDoS test:

a. The monitor controller 200 may be setup to send instructions to the coordination device 220 based on results garnered from the DDoS testing run, to various devices within the internal network 120 (deemed relevant to the DDoS mitigation strategy). Commands can be sent via an API or any communication protocol the mitigation device or service supports. This assists in strengthening the environment (organization's production environment) and may include configuration changes to third party devices e.g. routers, DDoS mitigation devices or scrubbing centers.

b. The commands sent to the devices of the DDoS mitigation 230 directly from the monitor controller 200 or via the coordination device 220 are in effect configuration changes in line with the DDoS mitigation policy of the organization. Any configuration changes made to the internal network 120 devices will be communicated from the monitor controller 200 via the coordination device 220 and services such as the scrubbing center 108 on the external network 100 may be from the monitor controller 200 via the coordination device 220 or directly from the monitor controller 200 not passing through the coordination device 220.

c. Devices that receive commands from the coordination device 220 may include but are not limited to, DDoS mitigation 230 devices, firewalls, routers, web application firewalls (WAF's), intrusion prevention systems/intrusion detection systems (IPS/IDS), and scrubbing centers d. The statistics gathered and aggregated on the monitor controller 200 can also be used to assist engineers troubleshooting an attack underway in real-time with an in-depth understanding of how an attacker has bypassed the various systems intended for DDoS mitigation. This is possible with two or more (two, three, or four) of the following components working together: the coordination agents 222, the coordination device 220, the simulator controller 204, and the monitor controller 200. This quick analysis can be facilitated by these components reporting to a single user interface (UI) where a graphical analysis is displayed to an administrator of the system.

4. A method to read current statistics on various DDoS mitigation devices and understand if an attack could be successful:

a. The coordination device 220 polls statistics such as open connection information (e.g. TCP stack), CPU utilization etc. from various network devices included in the DDoS mitigation 230 system, data from the coordination agents 222 can also be polled.

b. This information is then sent to the monitor controller 200 for further analysis and utilized in improving the current DDoS risk level assessment.

5. A method of knowing where to do more disruptive DDoS testing in limited maintenance windows:

a. After the ongoing non-disruptive testing has been completed and results are known (and viewable through the UI), all DDoS weaknesses identified can be reported 516 and accessible real-time in the user interface.

b. This report can now be used automatically to suggest the most relevant DDoS attacks to check during the maintenance period of strenuous more disruptive DDoS testing. Attack Vectors to be Checked The system is designed to verify known DDoS attack vectors or customized unknown attack vectors, against proprietary protocols and APIs. The attack vectors simulated and tested can focus on, for example, volumetric layer 3, 4 and application level (layer 7) DDoS attacks.

Some vectors include (this is a brief list and does not necessarily include all known and utilized routable protocols) i.e. is not comprehensive:

SYN Floods
ACK Floods
SlowLoris
LOIC
HOIC

UDP Floods
UDP Garbage floods
HTTP Flood
HTTPS
SSL renegotiation
Botnet simulations
Slowloris attacks
ICMP Floods The DDoS testing attacks are possible for both IPv4 and IPv6 networks as well as any other transport protocol that could be used to affect service availability to a production system (like internal network 120). The addressing scheme of TCP/IP is neutral, and this testing system may be applied to any protocol addressing scheme. An important point is the method of gathering statistics to make assumptions on the stability of the environment while simulating DDoS testing attacks. In addition, implementations of the current method for DDoS testing are able to understand, using traffic captured on the coordination device 220 if the environment is indeed vulnerable. This understanding of DDoS attack vulnerability of the environment is highly accurate and less disruptive to an organizations IT infrastructure, compared to conventional DDoS testing techniques. Without using a coordination device 220 the calculation maybe less accurate. Without pre-attacks being performed against the coordination device 220 and without continual real-time monitoring of the internal network 120 with the monitors 202 and the coordination agents 222, the risk of service disruption to an organizations IT infrastructure is significantly increased, as compared to just launching a series of conventional DDoS tests without having created monitoring baselines, creating known health levels (also known as ranges or thresholds) of the system from multiple vectors (external monitors 202 and internally deployed agents 222) and launching pre-attacks against the coordination device 220, slowly increasing DDoS testing attack rates/times, validating (assessing) health at each stage. After completing non-disruptive DDoS testing against the coordination device 220 then non-disruptive DDoS testing will proceed against production servers 126 in a similar methodology or verifying system health at each stage of the attacks, the non-disruptive DDoS testing is coupled with fail-safe altering or terminating of the ongoing DDoS testing attack traffic being sent by the simulators 206 and avoiding disruption to the targeted organizations IT infrastructure.

What Services are Validated During the Tests

During the DDoS testing any service, daemon, or application (for example web servers, gaming servers, email servers, DNS servers etc.) can be tested. Any service 124 or daemon that serves users 102 of that system is valid for DDoS testing.

This may include but is not limited to HTP servers, HTTPS servers, SMTP servers, DNS servers, SIP servers, database servers (MSQL, SQL etc. . . . ), FTP servers, SSH daemons, and other customized servers providing external or internal services. Of course, this is just a brief list of servers or services that service an organization's external customers and not limited to the services mentioned.

How Checks are Performed

Tests are designed and customized to address the needs, architecture, and security requirements of an organization.

The majority of attacks used by the DDoS testing service to perform an attack are traffic patterns not necessarily with any CVE/BID etc. The attack patterns are created according to real life DDoS attacks. Generally, there are predefined checks towards the coordination device 220. A combination of the following can be varied during testing:

Packets per second (PPS).
Connections per second (CPS).
Kilobits or Megabits per second (Mbps/Kbps)
Time of the simulated attack (seconds)

The simulated attacks launched from the simulators 206 and are designed to bypass current known mitigation systems incorrectly configured or lacking DDoS mitigation technology or have an incorrect architecture design with regards to DDoS attacks. Refer to DDoS device definitions elsewhere in this document.

Furthermore, the DDoS testing service can do DDoS vulnerability tests that are less focused on traffic flow and manipulation and more focused on a flaw or flaws within an application. Examples can be seen at:
http://web.nvd.nist.gov/view/vuln/detail?vulnId=CVE-2013-5211
http://web.nvd.nist.gov/view/vuln/detail?vulnId=CVE-2007-0087

There may also be optional traffic generation options from the DDoS simulator nodes 206 configured through the monitor controller 200, which updates the simulator controller 204. This optional traffic can be utilized to create realistic and customized scenarios designed to validate DDoS mitigation devices 230 capabilities when the organization is targeted with a sophisticated and prolonged DDoS attack from malicious attackers 104. This is done because some DDoS mitigation devices may have behavioral algorithms based on previously learnt statistics. This means that the simulator nodes 206 generate real traffic to appear as legitimate clients in some cases. This assists in getting more realistic results in some cases during a non-disruptive DDoS test.

Frequency of Checks

The tests can be scheduled to run on a daily, weekly, or monthly level at predefined time periods through a non-disruptive DDoS testing scheduler setup by an administrator, or on triggered events setup by the administrator. Optionally, custom settings can be used when a test is run and to adapt to the environment or the test (for example DDoS mitigation 230 and internal network 120). For example, if the coordination device 220 communicates a change in configurations on the internal DDoS mitigation device 122 or in the scrubbing center 108, this change could automatically trigger a retesting of the DDoS mitigation systems. Tests may also be manually initiated by the administrator of the system, for example, an administrator or engineer using an interface (such as a GUI) configured on the monitor controller 200 to generate and/or configure a test, initiate the test, and then monitor the test (attack while in progress real-time). Another example is updates on the simulator controller 204 device to definitions of new DDoS attacks being added may also trigger a test to take place. Alternatively, based on previous baselines created by the monitor controller 200, non-disruptive DDoS testing may be set to run at the most suitable time automatically selected by the administrator e.g. when the production services 124 are under the least amount of load (during a day or week).

Asset Monitoring

All services 124 being protected by the DDoS mitigation 230 strategy are monitored from one or more of the monitors 202. At a high-level monitors can be thought of a simulating users 102, however monitors 202 do much more, as described throughout this document. The monitoring may take place from one or more monitor nodes 202A and from one or more locations (for example US and Asia, or London and Moscow). Having monitoring nodes 202 in multiple locations may be important due to geo-location protections triggering dynamically on some mitigation modules (such as scrubbing center 108 of the DDoS mitigation 230) on the path to the coordination device 220 or services 124, even when small initial sample tests are taking place. The monitor controller 200 is preferably in constant communication to update the simulator controller 204. One way of understanding the monitor controller 200 is that the monitor controller 200 assists in ensuring there is no downtime caused by the DDoS testing performed against the organization. In a case where the monitor controller detects disruption that may result in potential downtime of one or more components of the organization's network (internal network 120) the monitor controller can inform the simulator controller 204 at any time to terminate simulators 206 sending DDoS traffic.

A sample of data that the monitor controller 200 can relay to the simulator controller 204 includes, but is not limited to:

1. If particular IP/FQDN (fully qualified domain name) and/or service is in healthy (meaning no service availability issues) status this can be determined through response monitoring of servers and services and previous baselines created and that the current responses are within a healthy level. For example, if a HTTP GET request to the web service 124A normally gets and HTTP response within 200 ms (according to the current baseline), and currently the HTTP response time is 230 ms this may be considered healthy.

2. If a particular IP or service is no longer in a healthy status (meaning a service availability issue has started), this is detected by one of the monitors 202 not receiving a response from a service or a sufficiently delayed or abnormal response on the coordination device 220 or one of the production services 124. For example, if web service 124A normally has an HTTP response time of 200 milliseconds (ms) for an HTTP GET request to a webpage begin served, and during testing there is no response for the HTTP GET, this lack of response may be considered an adverse affect to the web service 124A or the hosting web server 126A.

These response updates during testing are typically every few seconds at most, both prior to the simulator controller 204 scheduling tests to be run by one or more of the simulators 206 and during the testing. This will ensure that prior to testing, the production system 120 is stable, (and all services, such as service 124E and web service 124A are available, up, and running as expected). This will also ensure that the tests do not affect production 120 in any way (while the DDoS testing is being performed). This course of action is done for a higher level of certainty to avoid downtime. In other words, to maintain operation and avoid causing service disruption to the organization's services 124.

If the monitor controller 200 picks up a predefined level of "bad/unhealthy" health for a particular production service 124, the tests may be stopped on the simulators 206. This will ensure maximum uptime for the production environment 120

As a redundancy measure, commands can be sent directly to the simulators 206 (for example to simulator-A 206A) from for example monitor controller 200 to terminate any tests being run against a specific service (such as mail service 124C) or all services 124. This can be configurable as to when this redundancy measure is taken. This redundancy layer is an extra layer of protection to prevent the organizations IT infrastructure being affected in any way due to the DDoS tests being run on the production environment 120. This would likely only happen if the simulator controller 204 was out of contact and unable to communicate with associated simulators 206 (for example, loss of network connectivity) for a pre-determined amount of time. Optionally, implementation of this redundancy can also take into account additional parameters such as is the site "unhealthy/unstable" on a pre-determined level, with the monitor controller 200. One of the simulators 206 (for example simulator-A 206A) can terminate generating DDoS traffic if the simulator loses contact with its simulator controller 204.

How the Checks Work and where the Checks Come from and go to

Prior to testing (running attacks, checks) being run, all system status should preferably be healthy according to the monitor controller 200.

The DDoS tests are normally run with six main parameters:

1. Target—In FQDN or IP format (for example service 124E or database 124D)

2. Target port/service—The TCP or UDP socket e.g. TCP port 80 (HTTP) or UDP port 53.

3. Rate—What speed the test should be run at in terms of Kbps/Mbps, PPS, or CPS

4. Time—How long the particular test will be run for (For example 30 seconds)

5. Number of simulator nodes 206 from which to run (to use to generate the attack)

6. Iterations (with configured rate/time increases) to run— For example: Run 2 iterations—iteration1 to target x, port y, rate 300 PPS, time 30 seconds. Iteration 2 to target x, port y, rate 600 PPS, time 60 seconds.

How Many Separate Nodes should the Test Run from (Typically One or More).

6. Location of nodes from which to run tests (generate attacks)—Specify the location to run test from. The location can be one or more locations, either specified generally (for example Europe, only Europe, or Europe and Asia) or specified more specifically (for example London).

An example of SYN Flood parameters, for single simulation (there may be additional parameters added as needed for the test):

Time to run=10 seconds

PPS (Packets per second)=500

Target FQDN=device.mazebolt.com (this would map to the IP of the coordination device 220)

Target port=80

Nodes to run from =1

Location to run from=ANY

The parameters normally include "number of iterations", "rate increase per iteration," and "time increase per iteration". This allows a gradual buildup to testing an upper limit without having any downtime. Before proceeding to the next test, the monitor controller 200 can validate the health of the environment.

How the DDoS Testing System is Updated

The DDoS testing service can have a predefined list of attacks to check. However, there are new attacks emerging in the wild all the time. These new attacks can be updated by the developer based on research done on DDoS attacks in the wild as well as on the organization's environment.

The updates can be done from the monitor controller 200 to the simulator controller 204 or the coordination device 220 or both. The attacks can be updated on the monitor controller 200 and the receiving definitions updated on the coordination device 220 controller.

On the coordination device 220, updating can include updating receiving daemons/services/applications (to which the simulator nodes 206 send traffic) from the monitor controller 200 or locally installed. Other components and configurations that may need to be updated on the coordination device 220 may include information from a device in the organization e.g. internal DDoS mitigation device 122 configurations updates/changes.

Updates to the coordination device 220 software can also be done by connecting from the coordination device 220 to the simulator controller 204, the monitor controller 200 or another server with similar functioning. The coordination device 220 preferably has an auto rollback feature in case there are issues during the software update. The coordination device 220 preferably has a guided re-install procedure in the event of a software failure. The guided re-install procedure can format all data on the coordination device 220, including giving the coordination device 220 minimal amount of information possible to re-install i.e. IP address and username and password of the monitor controller 200 from where the coordination device 220 will get configuration parameters and software updates.

The updates can be scheduled for automatic updates at intermittent periods or manual updates. An important point is that updates are configurable per organization, if required. All configurations should be available for editing by a system administrator or other privileged users of the system (for example via a GUI).

Preferably, no information is passed out of the organization/from the DDoS testing service in clear text—all data will be hashed or encrypted. An exception is response monitoring for monitors 202. Monitoring is normally done in whatever protocol is necessary for the particular service e.g., HTTP response monitoring would not be necessary to encrypt. The method of communication between the coordination device 220 and the monitor controller 200 or the simulator controller 204 is preferably over an encrypted link, i.e. SSL communication, IPSEC or other similar methods.

How the Results are Posted Back to DDoS Testing System

The results of DDoS testing by the DDoS testing service are typically displayed in a management console user interface provided to the administrator utilizing the system. Each customer normally has a login to the system and can view at least the following information:

1. What aspects were verified for the test—for example, SYN Flood towards coordination device 220 or specific production servers 126.

2. The parameters of the test i.e. from where the test was run, from how many nodes the test was run, amount of time run, what locations, etc.

3. Test result differences between locations can also be displayed with regards to monitoring data from the monitors 202

4. If additional information was gathered from other sources, e.g. API calls to various equipment (for example internal DDoS mitigation 122)

5. If changes were made to the monitor controller 204 configurations because of information gathered by the coordination device 220, for example the removal of a coordination agent (the coordination agent 222A) from the web server 126A may take agent baselines out of future DDoS testing decision making made on the monitor controller 200 during a future DDoS test.

6. If any changes were made to other network devices by the coordination device 220 based on the results of the DDoS testing run e.g. if router 106 was modified during the testing or as a result of the testing.

7. A snapshot in time of the stability of all devices being monitored in the chain whilst the DDoS testing was underway e.g. a graph showing past/healthy baselines and during DDoS testing baselines of a particular or many services 124. This includes the stability status of the coordination agents 222 on the production servers 126 e.g. the coordination agent 222A on production web server 126A, stability of response time monitoring of the production service from the monitors 202 and stability of response time monitoring of the production server 126A, from the monitors 202. This can also include information on how the decision was made for if a particular one or more of the production servers 126 (for example web server 126A) or the coordination device 220 was vulnerable or not during the DDoS testing. All this is provided to the administrator of the system (for example graphically via a GUI) and with some text through the user interface.

8. A snapshot of the entire system can be taken in order to be able to understand what happened at a point in time. For example, how did all monitored services 124 change in health status during a DDoS tests as opposed to during normal production time without DDoS testing or real DDoS attack underway? Snapshots of the system simultaneously are a part of the system.

How the Device is Configured and Multi Configurations

The coordination device 220 is able to be deployed at multiple locations depending on need and distribution of the organization e.g. if two physical locations run production services 124, then two coordination devices 220 may be deployed, one coordination device 220 at each of the two locations. All information is transmitted back to the monitor controller 200 for reporting, evaluation, and backup.

Each coordination device 220 can have a separate set of configurations and daemons installed (which can be initially pulled from settings on the monitor controller 200, an alternative setup may be that the coordination device 220 pulls a configuration for the coordination device 220 from the simulator controller 204 or another device acting as a configuration server). All the configurations are preferably stored on the monitor controller's 200 database and can be re-installed easily for new deployments.

The configuration on the coordination device 220 can be backed up alternatively or only on the coordination device 220. Though this functionality may not be required for organizations (in this case relatively larger, more diverse, with a larger internal network 120), local backup can be helpful in using the DDoS testing system and manually configuring the coordination device 220. In another scenario backups may be stored on the monitor controller 200, simulator controller 204 or any other device acting as a backup server.

The configurations on the coordination device 220 typically include services 124 (such as example service 124E) such as a set of daemons and other information extracted from DDoS mitigation devices and manually input services 124. A goal of the service on the coordination device 220 is to emulate as much as the real production network (internal network 120) and the networks services 124 as possible (for example HTTP, DNS), there services will provide a more realistic pre-attack testing targets. These configurations on the coordination device 220, which are a set of daemons and service, are sent traffic from the simulators 206. The sent traffic is recorded by the coordination device 220. Traffic is also recorded by the coordination device 220 when simulators 206 send DDoS tests towards the production services 124. The traffic statistics and other required information is stored (on the coordination device 220 or the production servers 126 (by the coordination agents 222), as appropriate), and then sent back to the monitor controller 200 for evaluation via the coordination device 220 of that particular test. In some scenarios, the coordination device 220 may be setup to send data gathered from coordination agents 222 or other internal network 120 devices to the simulator controller 204 or similar server acting as a data storage facility.

The reason different configuration setups may be needed on the coordination device 220 is that there is a high likelihood that different networks for the same organization are responsible for different services 124. Also any new physical subnet which has other production servers will require another coordination device 220 to have the analysis capabilities and traffic monitoring capabilities (on a mirror port) for the services 124 for which production traffic passes through. Since during non-disruptive DDoS testing the coordination device 220 needs to sniff traffic targeting the production services 124 in order to gather statistics of how much passed through the DDoS mitigation module 230. The traffic captured on the coordination device 220 can also potentially be coupled with other data gathered on a particular coordination agent (for example coordination agent 222B) on the coordination device 220 and sent to the monitor controller 200 for analysis.

Monitoring of System for Administrators and During Tests

When a test is running, the administrator is preferably able to see in a user interface the following information:

1. If the test was performed.
2. What parameters were set during the test with regards to type of DDoS attack and attack parameters (for example 100 PPS for 10 seconds of SYN flood traffic to port 80)
3. If any challenges were identified, e.g. layer 7 or layer 4 challenges (for example SYN cookie challenges)
4. If the challenge can be bypassed, and if so how (is there a known methodology to bypass a SYN cookie challenge and if so are there other DDoS mitigation options)
5. An overview of how many tests were run (for example SYN flood run 3 times with x, y and z parameters. HTTP Flood run 3 times with x, y and z parameters)
6. How many tests passed or failed (i.e. if the target service 124E or mail service 124C are vulnerable to DDoS attacks or not) as what the results are, the decision making process of why that was concluded (For example during and HTTP flood when some unknown mechanism triggered with the DDoS mitigation module 230 from London and USA all monitors were unable to GET the home page and the graph shows monitoring baselines in both locations as unhealthy, so the testing was stopped for that DDoS test). This can also be according to location, since different locations may have different results.
7. Suggestions for hardening the site—when viewing a particular target server (one of the production servers 126, for example web server 126A.
8. A level of severity may also be assigned to a specific result to highlight the importance of the data being reviewed by and administrator e.g. high, low, and critical.
9. Mentioning other nuances identified by the testing e.g. how to optimize a certain protection e.g. lower the threshold for triggering SYN Flood protection or enable DNS flood protection
10. The decision-making process of the conclusion "exposed" or "protected" to a particular attack
11. Viewing each attack per target if the target is exposed or protected with decision information, i.e. why the target was deemed vulnerable, for example the web server 126A was exposed to or protected to a particular attack.
12. A history of decision making for attack simulations with the conclusion per past attacks launched (for example on June the first 2014 a SYN flood against target X showed target X was exposed to a SYN flood attack vector. On July the first a SYN flood against target X showed target X was protected against a SYN flood attack vector). So, the entire history of past attacks with the various decision-making parameters are available to the administrator of the DDoS testing system.

A. Current DDoS testing ongoing against specific targets.
   B. Overall current monitoring stability status of various targets (for example healthy or unhealthy). Also administrators are able to view which specific monitored protocols are in the healthy/unhealthy status for a particular target (for example HTTP GET or PING).

What Daemons can be Installed on the Coordination Device and What Other Characteristics does the Coordination Device have?

On the coordination device 220, the following daemons can be installed. This is only an example list and potentially any network service can be installed:

HTTP daemon
   HTTP daemon with virtual hosts
   HTTPS daemon
   Vulnerable HTTPS daemon
   FTP service
   DNS service
   SMTP service This list does not include all potential services and is expected to grow with the evolution of new networking services as well as customized software created within the organization. Essentially any socket that accepts a network connection can be setup on the coordination device 220. An SNMP or similar daemon can also be installed to get logs from various network devices, for example from the coordination agents 222 or internal DDoS mitigation 122, used to gather configuration changes of devices in the network. A daemon handling coordination agents 222 traffic is required on the coordination device 220. The coordination device 220 may also run a local coordination agent 222E for analysis on pre-attacks towards services (for example service 124E that is hosted on the coordination device 220). The coordination device 220 continuously passes data gathered from DDoS attack simulations launched towards production services 124 (for example web service 124A or mail service 124C) for statistical analysis to be passed back to the monitor controller 200. The coordination device 220 also gathers data from coordination agents 222 regarding all production services 124 (which have a coordination agent 222 deployed), and sends the gathered data back to the monitor controller 200. The gathered data is used to create baselines on the monitor controller 200 regarding things such as CPU utilization, TCP stack information or memory usage etc. (on each of the production servers 126 and/or services 124.)

Prior to DDoS testing being done, the monitor controller 200 communicates pre-attack information to the coordination device 220, such as what types of attacks are being launched against the production environment (internal network 120). This way, the coordination device 220 understands (from the content of the pre-attack information) what SRC IPs (from simulators 206), rate of expected packets (e.g. PPS), type of packets (e.g. SYN to port 80), attack length time (e.g. 60 seconds) etc. to monitor for and also which traffic data to gather, and/or the time the attack is scheduled to end. Then when the attack is over the coordination device 220 can pass this information (the gathered data) back to the monitor controller 200 to make conclusions about if the DDoS attack vector was successful or not against the particular target e.g. web server 126A. This signaling between the monitor controller 200 and the coordination device 220 is important for understanding how successful the attack vector was i.e. how much of the attack passed through the currently deployed DDoS mitigation

230. For example prior to the simulators 206 launching an ACK flood attack against the web service 124A, the coordination device 220 is first informed by the monitor controller 200 about the attack specifics going to be launched (simultaneously the coordination device 220 may inform the coordination agent 222A if configured to do so), e.g. 300 ACK PPS, to port 80, for 60 seconds targeting IP of web server 126A from source IP simulator-A 206A. The coordination device 220 begins monitoring source IP of the simulator-A 206A (also additionally the coordination agent 222A may do the same on the host on which coordination agent 222A is deployed) until coordination agent 222A is signaled by the monitor controller 200 the DDoS testing for the ACK flood is complete. At this point the coordination device 220 updates the monitor controller 200 that the coordination device 220 received 1000 ACK packets targeting the web server 126A port 80 from SRC IP simulator-A 206A at a rate of 16 PPS. Additionally the update may include any other information gathered from the coordination agent 222A via the coordination device 220 update or any other internal network 120 devices from which the monitor controller 200 is configured to receive updates/logs. This way, the monitor controller 200 understands how much attack traffic passed the DDoS mitigation module 230 and how deep into the internal network 120 the attack went.

The coordination device 220 can also analyze network traffic to a very low level if needed. This can include parsing packets from layer 2 through to layer 7. This analysis feature can be used when analyzing traffic in real-time on the coordination device 220, and the resulting statistics can be viewed through the user interface by an administrator. This functionality may also be used for threat assessment calculations as needed. This functionality is useful when troubleshooting or when the production environment (internal network 120) is under a real-time DDoS attack.

API to Integrate with Other Systems Based on Results or New Threats

An API on the coordination device 220 can interact with various devices (elements, sub-modules of the) DDoS mitigation 230. The API can query devices that have been setup for querying. Gathering information from various DDoS mitigation devices assists in minimizing the amount of traffic needed to trigger a particular event in the DDoS mitigation i.e. sending just enough traffic to trigger a particular DDoS mitigation mechanism on a particular device for example on internal DDoS mitigation 122. The gathering of information may help optimize DDoS testing times. For example, if SYN flood protection is triggered (identified from a configured API query to the internal DDoS mitigation device 122) after 50 PPS of SYN flood traffic towards a specific target and the data gathered on the coordination device 220 from the simulator shows no packets were captured during the test (meaning attack completely blocked) and the health status for monitored services 124 was unchanged a conclusion could be made that a further iteration of DDoS testing is not needed for SYN Flood for that port and target.

The API may also communicate with the simulator controller 204 and the monitor controller 200.

Interaction with Other Logs or Data from Other Systems During Test

For enhanced reporting to administrators, logs can be used from systems in the organizations. Logs are not limited to only the DDoS mitigation 230, but any other components such as firewalls, routers, IPs etc, to make smarter reporting available for the administrator.

For instance, if an attack is partially blocked logs can indicate that the administrator should tune a network device (for example a component of DDoS mitigation 230, such as router 106) to strengthen the current DDoS mitigation strategy.

The gathered data and logs can also be used to enhance the threat level of low, medium, high, and critical.

Alerting System

Alerting can be provided in a dashboard (for example, a GUI used by an administrator of the DDoS testing service) and can also be provided in other forms such as email or SMS message (if setup to do so). Alerting can include notification regarding new weaknesses or other important messages the DDoS testing system wants to inform the administrator about. The system can also be configured to send syslogs to SIEM systems. Alerts can be configured by the administrator on what alerts the administrator wants to see, including default alerting options. Preferably, at a bare minimum alerts should be shown in the interface to the administrator.

Refer again to FIG. 2. Traffic, for example from the simulators 206, can be sent directly to the coordination device 220. In addition or alternatively, port mirroring can be used (for example in the router 106) to send a copy of traffic destined for the production servers (such as web server 126A) to the coordination device 220, Port mirroring is one way the coordination device 220 can receive a copy of all incoming traffic towards the production services 124. Port mirroring is used on a network switch to send a copy of network packets seen on one switch port (or an entire VLAN) to a network monitoring connection on another switch port. This is commonly used for network appliances that require monitoring of network traffic such as an intrusion detection system, passive probe, or real user monitoring (RUM) technology that is used to support application performance management (APM). Port mirroring on a Cisco Systems switch is generally referred to as Switched Port ANalyzer (SPAN) or Remote Switched Port ANalyzer (RSPAN). Other vendors have different names for it, such as Roving Analysis Port (RAP) on 3Com switches.

A network tap is a hardware device that provides a way to access the data/traffic flowing across a computer network. In many cases, it is desirable for a third party to monitor the traffic between two points in the network. If the network between points A and B consists of a physical cable, a "network tap" may be the best way to accomplish this monitoring. The network tap has (at least) three ports: an A port, a B port, and a monitor port. A tap inserted between A and B passes all traffic through unimpeded, but also copies that same data to its monitor port, enabling a third party to listen. Either way, all services 124 being tested in the production network 120 by the non-disruptive DDoS testing system must have network traffic mirrored to the coordination device 220.

DDoS Mitigation and Scrubbing Centers

Refer again to the FIG. 2. As a non-limiting example, the DDoS testing service may also traverse the scrubbing center 108. The scrubbing center 108 in this case may have more than one mode of operation:

1. When traffic from the organization being diverted is done through a rerouting of traffic through BGP (Border Gateway Protocol) updates. This means that the only way to reach the destination network at the organization is now via the scrubbing center 108.
2. When traffic from the organization is routed through the scrubbing center 108 via DNS updates i.e. updating DNS records to point new traffic when querying a particular domain name. For example, when querying "mazebolt.com" then traffic for mazebolt.com will now be directed through the scrubbing center 108. However, if someone (one of users 102 or from one of attack nodes 104) was to access mazebolt.com IP address directly, then traffic from that user 102A or attack node-A 104A would not be redirected via the scrubbing center 108 and connect directly to the production network 120. In the current figure, the traffic would only go via the internal DDoS mitigation device 122 and scrubbing center 108 would not see traffic from the Internet 100.

In a case of DNS redirection, simulators 206 (for example simulator-A 206A) may send tests via both the scrubbing center 108 and directly to the organization's targeted IP (for example the publically available IP for web server 126A), that is only via the router 106 to the internal DDoS mitigation device 122 and not via scrubbing center 108. This traffic flow could also be the case for rerouting via BGP, assuming there were subnets not routed via the scrubbing center, i.e. traffic from users 102 on the Internet 100 passed only via the internal DDoS mitigation device 122.

The purpose of a DDoS mitigation strategy like DDoS mitigation 230 (for example, including the scrubbing center 108 and/or the internal DDoS mitigation 122) is to stop DDoS attacks arising on the external network (for example, Internet 100) using various mitigation techniques. Some techniques used in the internal DDoS mitigation device 122 or the scrubbing center 108 may include:

1. Static Signature based—The internal DDoS mitigation device 122 or the scrubbing center 108 has a database including specific, pre-defined signatures, and incoming packets are matched against the signatures.

2. Dynamic signature based—The internal DDoS mitigation device 122 or the scrubbing center 108 analyzes traffic dynamically and if a DDoS attack is recognized as being underway then a signature constructed on the fly is applied to incoming traffic (for example, block all TCP packets with destination port 880 to target 126A).

3. Challenges—Some internal DDoS mitigation device 122 or the scrubbing center 108 will challenge incoming packets to verify that in fact there is a legitimate client behind the incoming request. An example is an "HTTP 302" redirect to incoming customers; whereas a script an attacker (such as from attack node-A 104A) uses may be unable to interpret that redirect, a customer using a browser will have no issues in following the redirect and thereby being declared legitimate traffic by the device. This challenge can be for a variety of services such as DNS, SMTP, SIP, SYN and similar.

4. Blacklist—IP's can be blacklisted based on geo-location. This means that any request from a specific location will not be allowed through the DDoS mitigation 230. This blacklisting can be done either on the internal DDoS mitigation device 122 or upstream at the scrubbing center 108 or even on the router 106 or a firewall.

Coordination Device

Refer again to the FIG. 2. As described above, the monitor controller 200 and/or simulator controller 204 can communicate with the coordination device 220 (MB device). The coordination device 220 is preferably located within an organization's internal network 120 and typically protected by the DDoS mitigation strategy deployed in the organization. The coordination device 220 receives statistical and other information from coordination agents 222. The coordination device 220 also receives attack traffic from the simulators 206 regardless of if the traffic is destined for coordination device 220 or one of the production services 124. The coordination device 220 can communicate bi-directionally with the monitor controller 200 and may also be configured to communicate with other third party devices such as but not limited to the simulator controller 204. The coordination device 220 can assist in calculating whether or not the production environment is exposed to a certain type of DDoS attack. For example, with the gathered statistics of non-disruptive DDoS testing traffic from the simulators 206 data captured towards one of the production services 124. In an alternative configuration, the coordination device 220 can capture traffic for later analysis or on the fly (real time, current) analysis.

Roles of the coordination device 220 include the following:

1. The coordination device 220 is primarily a data collector for the monitor controller 200. In some cases, the coordination device 220 may interact with elements other than the monitor controller 200, for example, the coordination agents 222 such as coordination agent 222A or simulator controller 204. The coordination device 200 may also communicate with parts (modules) of the DDoS mitigation 230 strategy, for example, the scrubbing center 108 or the internal DDoS mitigation 122 in the organization (on internal network 120) (for example applying or removing a blacklist on the router 106 with a previous API setup between the coordination device 220 and the router 106).

2. The coordination device 220 can emulate one or more services 124 or daemons in the organization being protected by the DDoS mitigation system 230. Services 124 can include but are in no way limited to, HTTP, DNS, SMTP, SIP, and other services needed to provide value to users 102 and customers. The services 124 (for example the web service 124A or the mail service 124C) are services that an organization needs to provide to the users of the organization's infrastructure. For example, if a web service 124A is running on a web server (not shown) in the organization's production environment (internal network 120), a web service daemon would be setup on the coordination device 220. Setting up a web service daemon is represented in the current figure by the service 124E on the coordination device 220. A similar scenario (emulation) would happen for other available services (for example, the DNS node 124B, and the mail service 124C). In this way an alternative in a pre-attack is that the simulators 206 may target, with non-disruptive DDoS testing prior to other production servers 126, first the services 124 on the coordination device 220.

3. The coordination device 220 receives traffic from the simulators 206. The traffic is stored and evaluated by the coordination device 220 as needed per the pre-attack notification information. The results from the coordination device 220 are sent out from the internal network 120 back to the monitor controller 200 for evaluation and analysis. In a non-limiting example, prior to a DDoS test the coordination device 220 is informed by the monitor controller 200 to expect "100 PPS of type SYN flood from simulator nodes 206A and 206N SRC IP's, to port 80 for 10 seconds, towards target IP of the web server 126A". Having this pre-attack notification information, when the DDoS test is completed, the coordination device 220 will then inform the monitor controller 200 of received data, for example "X packets, to port 80, with destination IP of web server 126A". The monitor controller 200 can then make conclusions of how successful the DDoS testing was against web server 126A, and if web server 126A is protected or unprotected against the SYN flood). The coordination device 220 may also signal to the coordination agents 222 that non-disruptive DDoS testing is about to start (in conjunction with the DDoS attack specifics), the information in this signaling to the coordination agents 222 may include some of the pre-attack notification information provided to the coordination device 220. Pre-attack notification information is sent to the coordination device 220 regardless of if the DDoS testing being done is towards the coordination device 220 or towards one of the production servers 126.

4. The coordination device 220 receives various attacks from the simulators 206. The attacks can include high rate and low rate floods as well as volumetric (sometimes referred to as layer 4) and application layer (sometimes referred to as layer 7) floods. The coordination device 220 will receive traffic destined both for both production web services 124 (for example 124A, 124B) via port mirroring and destined toward the coordination device 220.

5. The coordination device 220 can pool data from the internal DDoS mitigation device 122 and coordination agents 222 and also aggregate or analyze in real-time received network traffic.

6. Typically, the coordination device 220 collects information from the coordination agents 222. The coordination agents 222 collect information about the services 124 with which the coordination agents 222 are deployed (for example coordination agent 222A collects information regarding web service 124A (for example TCP stack information, CPU utilization, number of open apache processes etc.), and the coordination agent 222B collects information about DNS node 124B). Combined information from the coordination device 220 can then be passed to the monitor controller 200 and/or the simulator controller 204. Information from coordination agents 222 can be used to determine the health and status of the system. The coordination device 220 can communicate with both the simulator controller 204 and the monitor controller 200.

Coordination Agents

The DDoS testing system preferably includes one or more coordination agents 222 deployed on one or more productions servers or the coordination device 220 on an organization's internal network 120. The coordination agents 222 report statistics regarding operation and status of the server on which the coordination agent is deployed. Reporting includes, but is not limited to, TCP stack information, process information, CPU utilization, memory utilization etc. Normally the coordination agents 222 report to the coordinating device 220. The statistics gathered by the coordination agents 222 may be used to understand the stability of the particular device or server on which the reporting coordination agent is deployed. The coordination agents 222 continually report operation data back to the coordination device 220 (which in turn reports operation data back to the monitor controller 200), to subsequently create baselines/thresholds on the monitor controller 200.

In an alternative configuration, the DDoS testing service can be implemented only with coordination agents 222 (without the use of the coordination device 220). In this case, communication is directly between the coordination agents 222 and the other devices (such as the monitor controller 200), as opposed to the preferred configuration of communicating via the coordination device 220.

Monitor Controller

The monitor controller 200 is a logical controller (node, device), which commands one or more monitors 202 to start or stop sending various monitor traffic towards the organization's production servers or the coordination device 220. The monitor controller 200 assists in creating statistical information baselines about how stable the production servers are, or how stable the coordination device 220 is. The monitor controller 200 controls what monitors 202 are started, with which cloud provider (node provider) and how many. Some of the information the monitor controller 200 will tell the monitors may include but not limited to, how frequently to send a probe network packet to the monitored production server or coordination device 220 services 124, what type of packet to send e.g. HTTP GET packet or PING, and what metric to report back to the monitor controller. The monitor controller 200 can be supplied with the pre-attack notification configuration information as a source for commanding, controlling, and monitoring the monitors 202 (for example monitor frequency).

Monitors

Preferably, the DDoS testing system includes one or more monitors 202. Monitors are nodes (devices) that are instructed by the monitor controller 200 as to what types of network probes to send and to which targets. Typically, there is a multitude of monitors 202 monitoring production servers or the coordination device 220 emulated services 124.

Monitors 202 gather various traffic statistics and other data (for example, identified mitigation traffic sent by a mitigation device like SYN cookie protection) to send to the monitor controller 200. The monitor controller 200 can use this gathered data for decision making, in particular regarding the health and status of the organization's production environment (internal network 120) or targeted web server 126A. The monitors 202 can be used to understand the system stability status view from the external network (Internet 100). Additional elements can contribute to this understanding and are reported to the monitor controller. For example, the coordination agents 222 generally report to the coordination device 220, which in turn reports to the monitor controller 200. The reported data from the coordination agents 222 can then be used by the monitor controller 200 to assist in evaluating the health and status of the system (production environment).

Similar to the above-described operation of monitors 202, the simulators 206 generate DDoS test traffic towards both the coordination device 220 and other servers on the internal network 120. Other servers include devices and nodes such as a web server running the web service 124A, a mail server running the mail service 124C, or a database server configured with database service 124D. Traffic generated by the simulators 206 can include SYN Floods, UDP Floods, HTTP GET floods, or any other DDoS attack pattern as known in the art. DDoS traffic from the simulators 206 is sent in a predictable way to the coordination device 220 or other internal network 120 servers (also known in a predictable way to the coordination device 220, the coordination device 220 preferably knows the non-disruptive DDoS testing attack specifics, which the coordination device 220 gets preferably from the monitor controller 200, prior to the attack traffic being launched towards the target of the planned attack. In some cases, the coordination agents 222 will also receive advanced notice of non-disruptive DDoS testing attack about to be done and when the non-disruptive DDoS testing attack is complete, since the coordination agents 222 may also alter behavior during non-disruptive DDoS testing).

Simulator Controller

The simulator controller 204, also referred to in the context of this document as a "DDoS traffic simulator controller", contributes to governing how DDoS simulation traffic should be launched against the targeted environment. The simulator controller 204 is a logical controller (node, device), which commands one or more simulators 206 to start or stop sending various attack traffic towards the organization's production servers 126 or the coordination device 220. Some of the commands the simulator controller 204 can tell simulators 206 include: when to start and stop sending traffic, what type or traffic to send, what rate to send the traffic at, how long to send the traffic for etc.

The simulator controller 204 can also communicate bi-directionally with the monitor controller 200 and can receive commands such as stop attack, start attack, configuration updates, etc. There are many commands that the simulator controller 204 can get from the monitor controller 200, for example to stop a currently active attack, because the targeted system is detected as unhealthy. This communication between the monitor controller 200 and simulator controller can avoid disruption to the targeted network. Alternatively, the simulator controller 204 can also communicate with the coordination device 220.

Simulators

One or more simulators 206, preferably a multitude simulators 206 are nodes (devices) that launch DDoS testing attack simulation traffic. The simulators 206 receive commands mainly from the simulator controller 204. The received commands include, but are not limited to stop attack or start a certain type of attack for a certain amount of time at a certain rate against a specific target (DDoS testing attack parameters). The simulators 206 may also report data back to the simulator controller 204 and read responses from the targeted network undergoing the simulation. Examples of responses are SYN cookie challenges or ICMP replies. Simulators 206 can be set to send an exact amount of packets towards a production server (for example web server 126A) or to the coordination device 220 for an exact amount of time. Signaling between the simulators 206 and the simulator controller 204 is preferably bidirectional. The simulators 206 may also be configured to stop all non-disruptive DDoS testing attack traffic if communication (Signaling) is lost with the simulator controller 204, this is done as a failsafe mechanism.

Operation

The verification system (DDoS testing service) is typically configured on the external network (Internet 100) with two main controllers: the monitor controller 200 and the simulator controller 204. Both controllers (the monitor controller 200 and the simulator controller 204) communicate with each other for coordination purposes (to coordinate operation of the DDoS testing service). The monitor controller 200 directs monitors 202. Simulator controller 204 directs simulators 206.

The monitor controller 200 and the simulator controller 204 have a bidirectional communication channel for coordinating activities. The coordination device 220 has a communication channel with at least one of the controllers (monitor controller 200 or simulator controller 204) for coordinating monitoring and simulation activities.

The coordination device 220 is generally deployed in the de-militarized zone (DMZ) and can see (monitor) all traffic from the Internet 100 entering the internal network 120 (for example traffic towards the production servers 126).

All traffic coming from the monitors 202 or the simulators 206 should traverse the DDoS mitigation strategy deployed 230. Traffic from the simulators 206 can be analyzed or received by the coordination device 220. Traffic coming from the monitors 202 can reach the services 124 being monitored. As described elsewhere, the coordination device 220 generally is configured with services 124 (such as exemplary service 124E) and/or coordination agents 222.

The monitors 202 generate traffic towards both the coordination device 220 and other servers on the internal network 120. Other servers include devices and nodes such as a web server running the web service 124A, a mail server running the mail service 124C, or a database server configured with database service 124D. Traffic is sent in a predictable way to either the coordination device 220 or other internal network 120 servers or the coordination agents 222.

The coordination device 220 records all traffic generated from the simulators 206. Traffic is recorded by the coordination device 220, regardless of whether or not the target of the traffic from the simulators 206 is generated towards a production server 126 (for example web server 126A) or the coordination device 220.

The monitor controller 200 validates that the (internal) services 124 and/or the coordination device 220 is stable prior to the simulator controller 204 signaling to the simulators 206 to send DDoS traffic. The monitor controller 200 decides if the targeted services 124 (for example 124B) are stable by utilizing information gathered from the monitors 202 and/or the coordination device 220.

Prior to beginning a test (attack on the internal network 120), the test is designed or selected, typically by an administrator user or default settings in the system. User interaction, in particular for an administrator to configure the system can be considered a user interaction module (not shown in the figures). One skilled in the art will realize that the user interaction module can be configured on a computer separate from, or on one of the monitors (monitor controller 200, simulator controller 204, monitors 202, simulators 206, coordination device 220), or another local or remote computer device. For simplicity of this description, a preferred embodiment is where the user interacts via the user interaction module installed on the monitor controller 200. The desired test of the organization's DDoS mitigation 230 is characterized by pre-attack notification information regarding the parameters of the test to be conducted. Parameters can include, but are not limited to one or more types of attacks to be launched, when each type of attack will be launched, and parameters of each type of attack such as begin time, end time, amount, size, speed, repetition, location, etc. Typically, the monitor controller 200 sends the pre-attack notification information to all appropriate devices, normally the monitor controller 200, the simulator controller 204, and the coordination device 220. Subsequently, the monitor controller 200 sends the appropriate information to the monitors 202 to monitor the test/change monitoring frequency, the coordination device 220 sends the appropriate information to the coordination agents 222 to monitor the test/change monitoring frequency, and the simulator controller 204 sends appropriate information to configure appropriate simulators 206 to be prepared to generate the non-disruptive DDoS testing attack.

When the monitor controller 200 deems the target (for example mail service 124C, coordination device 220, or web service 124A) is stable, the monitor controller 200 will signal to the simulator controller 204 to begin sending traffic towards the internal network 120. The simulator controller 204 will signal to simulators 206 to begin sending traffic according to the specification (pre-attack notification information) previously sent by the simulator controller 204.

During the time that the simulators 206 are sending traffic towards the internal network 120, if the monitor controller 200 detects any stability issues with the monitored services 124 or coordination device 200, the monitor controller 200 can make the decision to alter or stop the simulators' 206 traffic. This can be done by signaling from the monitor controller 200 to the simulator controller 204. In turn, the simulator controller 204 notifies the simulators to alter or stop the traffic being generated by one or more simulators 206. An alternative setup may be that the monitor controller 200 may signal directly to the simulators 206 directly to start or stop the DDoS testing attacks.

The simulators 206 may also stop sending traffic if signaling is lost between one or more simulators 206 and the simulator controller 204. The simulators 206 have the ability to terminate sending traffic autonomously. For example, in a case where signaling is lost between simulator-A 206A and the simulator controller 204, simulator-A 206A can make a decision, independent of other system devices, to terminate sending traffic.

Generating Baselines

Monitors 202 send traffic probes through the DDoS mitigation system 230 (for example via the scrubbing center 108, the router 106, and/or the internal DDoS mitigation 122) to services 124. The probes facilitate verification of response rates both when the simulators 206 are generating traffic and when the simulators 206 are not generating traffic (idle). Using this method, the monitor controller 200 knows what a normal/healthy response rate from services 124 and an unstable/unhealthy response rate from services 124 looks like. In other words, the monitors 202 can use probes to characterize the normal, stable, operational, defending, unstable, and crippled status of the internal network 120 and/or services 124. Monitor controller 200 utilizes monitors 202 to create baselines to understand and differentiate between normal responses and unstable/unhealthy responses.

A current baseline is one piece of data that allows the monitor controller 200 to make decisions since the baselines are determined prior to testing (adjusted with previous monitoring, using operation data from either coordination agents 222 or monitors 202) ranges of stability/health levels. Decisions made by the monitor controller 200 could cause signaling to occur to the simulator controller 204, the monitors 202, or the coordination device 220. Baselines are normally stored on the monitor controller 200. Baselines can indicate one or more services 124 are currently unstable or down (unavailable). Baselines are a constantly updated running average or some other measurement used to be able to identify current normal (stable/healthy) service 124 statuses and also be able to identify current abnormal (unstable/unhealthy) service 124 statuses. Multiple baselines may be created for a single service, for example ICMP response time per minute, per hour, per day or per week. Baselines are then utilized to understand if a service has become unstable based on how far the response time has deviated from the response time's normal/stable threshold. For example, if the normal baseline for ICMP response (for a particular monitored target) prior to a non-disruptive DDoS test being performed is 100 ms (regardless at which monitoring frequency the response threshold was recorded at) and then the non-disruptive DDoS testing attack starts against the target and the baseline (preferably under a high level of monitoring frequency e.g. 3 seconds) changes to an ICMP response time of 200 ms, the response threshold may be deemed to have deviated enough to now be considered that the current monitored ICMP response time is over the threshold of unstable and therefore the monitored service 124 is considered in an unstable state. Baselines are created both for monitors 202 data and the coordination agent's 222 data, just with coordination data the baseline being created is more for system specific information (e.g. TCP stack usage, free memory, possess information etc.).

Testing Against the Coordination Device

Refer again to the current figure. An example case is now described in which the DDoS simulators 206 first validate various DDoS traffic against the coordination device 220. After the simulators 206 have finished DDoS testing without an unstable/downed state being detected by the monitor controller 200 (with information gathered from monitors 202), then verification (attack test) takes place against production services 124 (for example 124A, 124C). This case includes the following steps:

1. Simulator controller 206 launches DDoS attack traffic via simulators 206 against the coordination device 220 on the internal network 120. The coordination device 220 is validated against that particular attack (for example SYN Flood).

2. Based on settings for the DDoS testing service, if the coordination device 220 is protected (the coordination device 220 settings are dynamic), then simulator controller 204 will signal to the simulators 206 to launch attacks directly against the production servers (for example web server 126A and corresponding web service 124A).

3. The attacks are performed with simulator controller 204 settings (as per the pre-attack notification information), including such parameters as type of DDoS attack traffic, rate of DDoS attack traffic, iterations, and time to run. The simulator controller 204 may get its settings from the monitor controller 200 or any other similar configurations setting device.

4. During the time the production server (in this example web server 126A) is being tested by the simulators 206 all traffic is monitored by the coordination device 220. The traffic can be monitored because all traffic in the internal subnet 120 has been mirrored to the coordination device 220

5. If the production service (for example web service 124A) or any other server (other than web server 126A, based on monitor controller 200 settings) are deemed to be in an unhealthy status i.e. response time slowed down on the monitor controller 200 baselines (i.e. the response time is now at an unhealthy threshold), or coordination agent 222A (which updated coordination device 220, which updated the monitor controller 200) baselines, have deviated to unhealthy, the attack may be stopped (by the appropriate simulators 206) and the relevant threat status assigned.

6. A similar process as the above-described takes place for each type of attack run, first against the coordination device 220 and then against the actual production server (for example web server 126A). The DDoS testing service can also be configured to refrain from testing (not perform testing/attacks).

Testing Via a Scrubbing Center

Refer again to the current figure. An example case is now described in which the testing is done using the scrubbing center 108. The simulator controller 204 signals simulators 206 to generate traffic to the internal network 120 via the scrubbing center 108. As in the previously described cases, traffic may be sent first to the coordination device 220 and baselines generated. This case includes the following steps:

1. Simulator controller 204 signals to simulators 206 to launch DDoS attack traffic targeting the coordination device 220 and/or services 124. The coordination device 220 (or more specifically the services such as service 124E on coordination device 220) is validated against that particular attack, with all traffic sent via the scrubbing center 108.

2. One or more, typically all, production servers (for example web server 126A) are monitored at a rapid rate by the monitors 202 similar to other tests (cases). Any unstable status detected by the monitor controller 200 may lead to termination of the generation of test traffic by the simulators 206.

3. When the coordination device 220 has finished being tested for a particular attack and was not affected adversely, the production servers (for example web server 126A) are tested by generating attack traffic against the production servers. Checking of the production servers can be done one at a time (serially) or more than one simultaneously (in parallel). This time though the simulation of the attack from the simulators 206 will go through the scrubbing center 108.

4. For the decision making process of if the attacked service (for example web service 124A) is exposed or protected, the traffic sent from the simulators 206 can be sent via a scrubbing center 108 or directly to the organization's internal network 120 (via the router 106).

Continuous Monitoring

Figure 3:
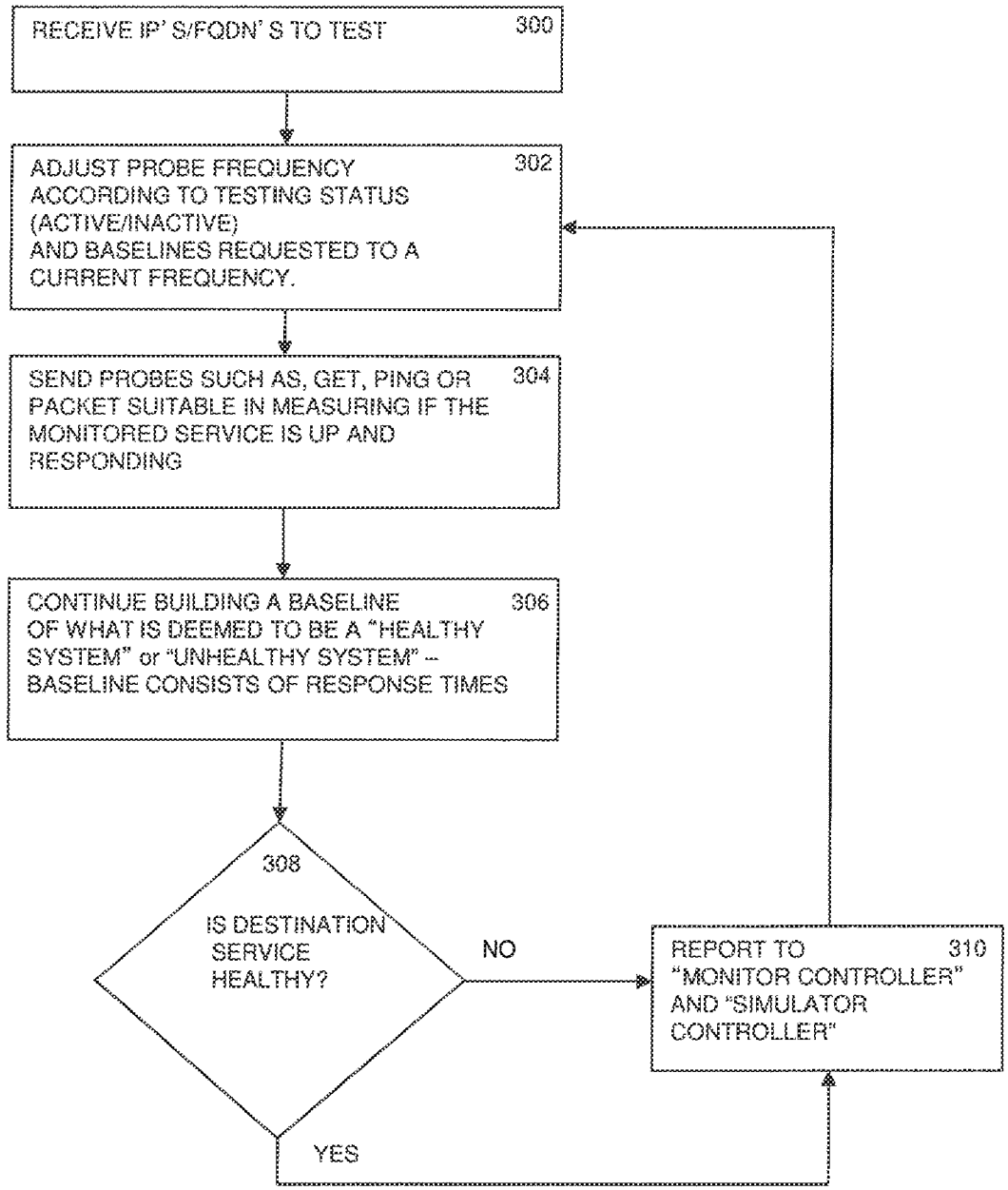
FIG. 3 is a flowchart of a method for the monitor controller to continuously monitor input IPs and FQDNs.

Refer now to FIG. 3, a flowchart of a method for the monitor controller 200 to continuously monitor input IP (internet protocol) addresses (also referred to simply as "IPs") and fully qualified domain names (or referred to simply as "FQDNs") in a registry of the monitor controller 200.

The IPs and FQDNs are normally production servers on which actual production services or the coordination device 220 service are running on the internal network at the organization's site. If the DDoS mitigation 230 is successful (sufficiently effective) the IPs and FQDNs should not be affected during testing (during an attack simulation). The monitoring cycle on the monitors 202 of the current figure can be sped up (increased) and slowed down (decreased) depending on whether there is a DDoS test ongoing (an active test). For example, without a test ongoing a query every 20 or 30 seconds may be sufficient to monitor the services and create a healthy system baseline in the organization during normal operation. However, while a test is being performed the monitor controller 200 may instruct monitors 202 to increase the monitoring cycle to be, for example, every 3 seconds to reduce the likelihood of any adverse effects on the production environment by detecting a deviation from the normal healthy baseline as quickly as possible. Depending on the requirements of the organization and configuration of the DDoS testing service, the monitor controller 200 can decide how to handle the messages (information being returned by the monitors 202). The monitoring cycle is also referred to as "monitoring frequency" or simply "frequency". As monitoring is typically done using probes, the monitoring cycle is also referred to as "probe frequency". An increase in the monitoring cycle corresponds to a higher (quicker) frequency, and similarly a decrease is a lower (slower) frequency.

In step 300, the monitor controller 200 receives IPs and FQDNs to be monitored during a scheduled test (pre-planned attack) or ongoing monitoring (to continually update the baseline) without a scheduled attack. First, a baseline of normal response for at least one network service (for example HTTP GET response) on at least one IP and/or FQDN is generated (in the setup and ongoing phases). In step 302, the monitoring frequency is adjusted to an appropriate current frequency (of whether or not an attack is active or about to be active)/inactive). As described above, if an attack simulation is about to take place, the monitoring frequency will be increased from a relatively lower frequency used during normal operation (for example every 20 or 30 seconds) to a relatively higher frequency used during testing (for example, every 3 seconds). This increase in frequency during testing helps to avoid a delay in understanding if the system under test has become unstable. Optionally, one or more coordination agents 222 can be updated to speed up monitoring. In step 304, the monitor controller 200 initiates sending probes to the IPs and FQDNs at the relevant current frequency set in step 302. Preferably, the monitor controller 200 controls one or more monitors 202 to send probes to the targeted servers. Types of probes include, but are not limited to "HTTP GET", ping, and other known probes. In step 306, a baseline is created and/or updated using the information received from monitors 202. Examination of the baseline can be used to see if the target is healthy or unhealthy (service availability of production servers 124 adversely affected or not) or has become unhealthy for the particular service (network service) being monitored. In step 308, the current baseline is evaluated to understand if the current baseline is healthy or unhealthy. In step 310, regardless of the health status of the target being monitored, the current health status is reported to the monitor controller 200 and the simulator controller 204. Then monitoring continues by returning to step 302 and adjusting the monitoring frequency, as necessary and continues updating the baselines with information from the monitors 202. In step 310 the monitor controller 200 could alternatively signal the simulator controller 204 to terminate ongoing non-disruptive DDoS attack testing on the simulators 206. In step 300 other monitoring commands may be received by the monitor controller for example, adding/removing new IPs or FQDNs, starting stopping service monitoring etc.

As described elsewhere in this document, an alternative method of operation has the monitor controller 200 shutdown the simulators 206 by signaling the simulator controller 204. The shutdown may be necessary if the destination services 124 being monitored (by monitors 202) are continuously deemed unhealthy or unstable.

Checking Status and Decision to Continue Testing

Figure 4:
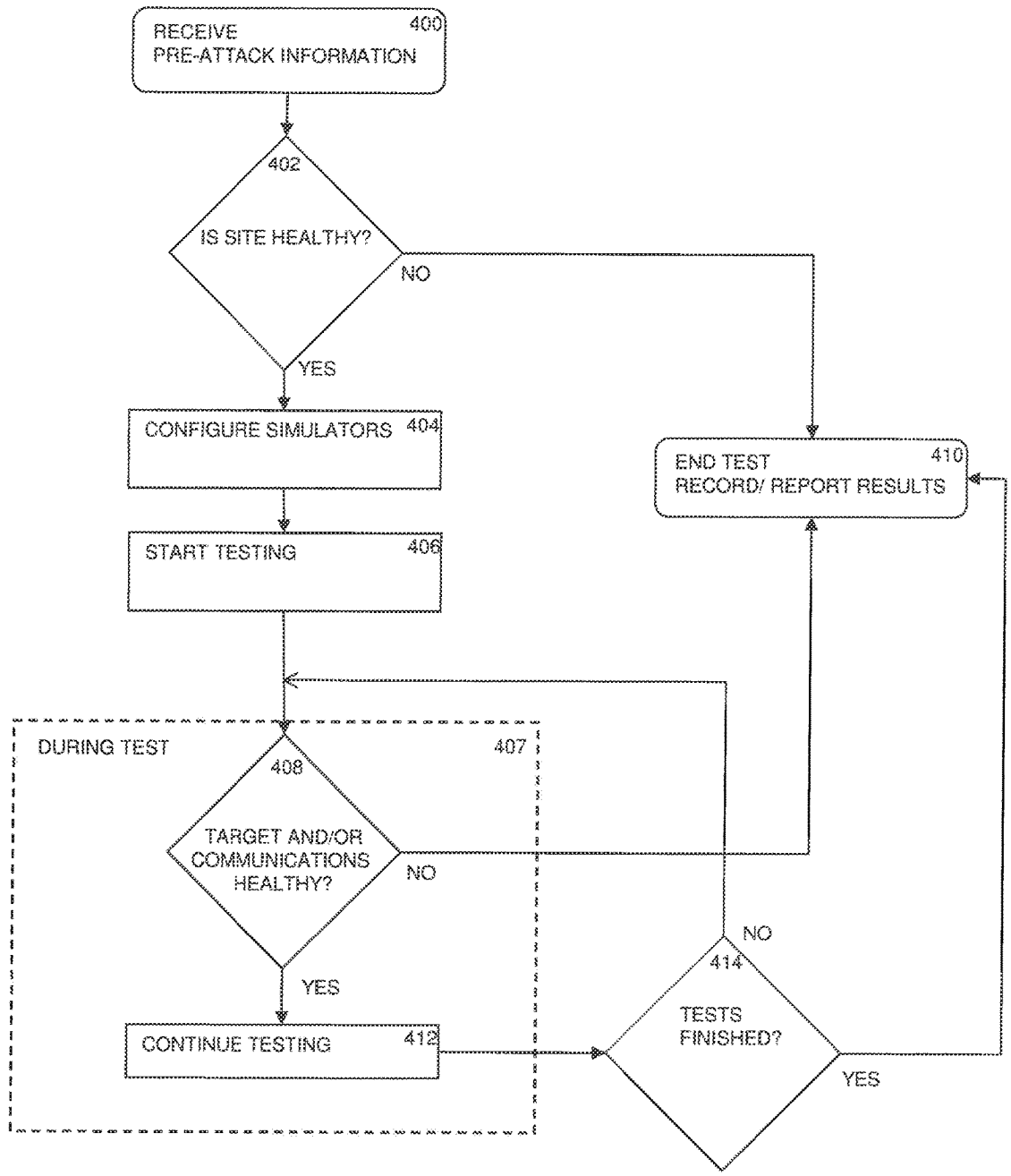
FIG. 4 is a flowchart of a method for checking status and deciding to continue testing.

Refer now to FIG. 4, a flowchart of a method for checking status and deciding to continue testing. In step 400, the simulator controller 204 receives the DDoS simulation parameters to use for the DDoS testing (pre-attack notification information). In step 402, the monitor controller 200 is queried to validate system health status. The answer to this query in combination with various administrator-defined settings will decide if the DDoS simulation (testing attack) will proceed, however preferably the monitor controller 200 will signal the simulator controller 204 to continue or terminate the ongoing non-disruptive DDoS testing attack. If the attack will not proceed, the method continues at step 410 and the test is ended (in this branch, before the test even began). If the attack will proceed, the method continues in step 404 to configure the necessary DDoS simulators 206. Configuring the simulators 206 includes for each one or more simulators 206 sending appropriate pre-attack information, preparing, and making ready to launch the DDoS simulation attacks. After the simulators 206 are configured and prepared, then in step 406 DDoS testing is started (at this point the coordination device 220 and/or the coordination agents 222, the monitor controller 200, have already been updated with pre-attack notification information).

During testing (shown as box 407) in step 408 the monitor controller 200 is checked for a change in system health status. The simulator controller 204 can also receive updates from or query the monitor controller 200 and can be used in step 408 to make a decision regarding system health. If the system health (health of the service 124 and/or servers such as web server 126A) is unacceptable (not healthy/unstable) and/or there is insufficient communication between components (communications are inactive or crippled between monitor controller 200 and simulator controller 204), the method continues to step 410 and the test is ended; this is another fail-safe mechanism to avoid downtime during non-disruptive DDoS testing. In contrast, if the system health (health of the services 124 and/or servers such as web server 126A) is acceptable (healthy/stable) and there is communication between components (communications are active between monitor controller 200 and simulator controller 204), the method continues to step 412 and testing continues. In step 414, a check is made if the pre-arranged tests (based on the pre-attack configuration information) are finished. If the tests are finished, the method continues to step 410 and the test is ended. If the tests are not finished, the method continues and returns to step 408. Either way, (from either step 408 or step 414) at step 410 when the test is ended, the testing results are recorded for use by the administrator, for example for reporting and to view through a user interface.

Interaction of DDoS Testing Service Elements

Figure 5:
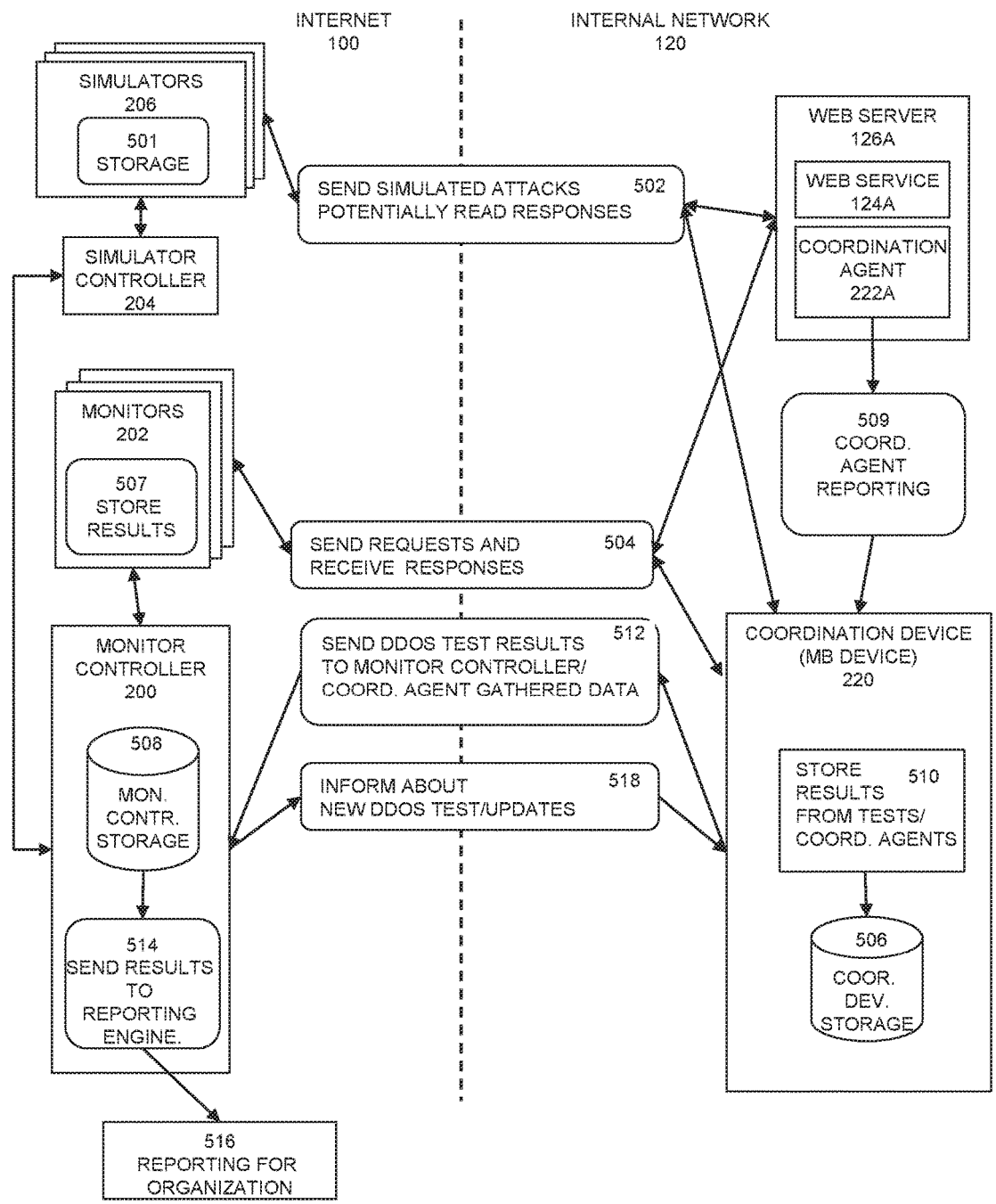
FIG. 5 is a simplified diagram showing interaction of DDoS testing service elements.

Refer now to FIG. 5, a simplified diagram showing interaction of DDoS testing service elements, shows a basic configuration of how the monitor controller 200 on the external network (Internet 100) and the coordination device 220 or one of the production servers 126, such as web server 126A, interact with each other. In general, results from the coordination device 220 are sent to the monitor controller 200 for further processing and reporting.

As described elsewhere in this document, simulators 206 send simulated DDoS attacks 502 against the internal network 120, to components such as the coordination device 220, or services 124 on production machines, for example, production servers 126. Simulators 206 may be able to read some of the DDoS attack traffic responses, this can be used to understand more about how that particular attack traffic is being mitigated, or not mitigated). Optional storage 501 respectively on the simulators 206 can be used to store data. The simulator controller 204 could also optionally have local storage data (not shown).

Coordination agents 222, such as coordination agent 222A, typically report 509 to the coordination device 220. Reporting is preferably as close to real-time as possible (during non-disruptive DDoS testing), and sent to the monitor controller 200 for updating the particular coordination agent's 222A baseline.

The coordination device 220 stores results from tests 510 in a local coordinator device storage 506 during DDoS testing. After each DDoS test (from the simulators 206), the data gathered on the coordination devices storage 506 is sent to the monitor controller 200 for analysis and decision-making (for example was the DDoS test attack successful or not). Regardless of success or not, if another non-disruptive DDoS test takes place the pre-attack information needs to be initiated once again.

Monitors 202 send requests (for example HTTP GET) and receive responses (HTTP response), this is how a health (stability) baselines are created for a particular service e.g. web service 124A being monitored for a particular server e.g. web server 126A in the production network 120. Baselines for both monitors 202 and coordination agents 222 can be stored and updated on the monitor controller storage 508. When needed, the monitor controller storage 508 is queried to get the necessary data for decision-making (for example stopping an ongoing DDoS test). In another example, if a DDoS test is ongoing, and simulators 206 are sending attack traffic 502 the monitor controller 200 may use all the latest data gathered from the coordination agents 222 (e.g. coordination agent 222B collected data on current CPU utilization, memory utilization etc. of the DNS node 124B) and also the latest data gathered from the monitors 202 (for example DNS query/response time is X ms) and make a decision on whether or not to inform the simulator controller 204 to tell the simulators 206 to stop the DDoS testing traffic currently being generated to production node 124B.

DDoS test results are sent 512 from the coordination device 220 to the monitor controller 200. Gathered data results can include from operation data from coordination agents 222 and/or the coordination device 220, either before, during, or after an attack (test).

The monitor controller 200 can inform 518 the system regarding new tests, send pre-attack information, update configurations, and send updated operational information (for example to adjust settings, increase monitor cycle time of coordination agents 222 or the coordination device 220) during DDoS testing.

Both simulators 204 DDoS test traffic data (if any and if enabled for analyzing potential mitigation mechanisms in place e.g. LA SYN cookie challenge) and monitors 202 store results, for example monitors 202 store on respective result storage 507, and simulator controller 204 may also include storage (not shown).

Results can be sent 514 to a reporting engine, for example at pre-determined times, as per the pre-attack configuration, or upon administrator requests via a user interface. Processing of results takes place on the monitor controller 204 or at another location, such as another element doing reporting for the organization 516.

Interaction of Simulator Controller and Simulators

Figure 6:
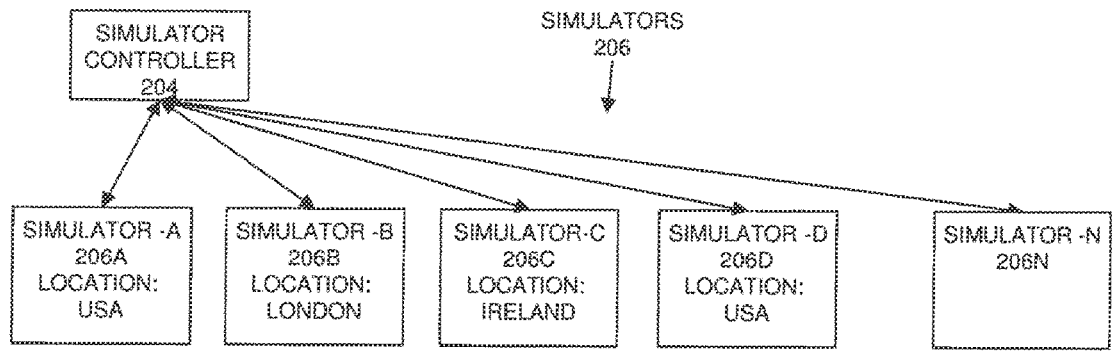
FIG. 6 is a sketch of interaction between the simulator controller and the simulators.

Refer now to FIG. 6, a sketch of interaction between the simulator controller 204 and the simulators 206. The simulator controller 204 and the simulators 206 initiate DDoS traffic generation from various locations around the world. This is done by starting (initiated by the simulator controller 204) one or simulators 206 in various physical locations, for example, simulator-A 206A in the US, simulator-B 206B in London, simulator-C 206C in Ireland, and simulator-D 206D in the US. The simulators 206 are configured and controlled by the simulator controller 204 based on at least the pre-attack configuration information. If any of the simulators 206 are in the middle of a DDoS test generating traffic, and loose communication with the simulator controller 204, then preferably the simulator that has lost communication terminates generation of DDoS testing traffic. This termination is independent, in other words the simulator that has lost communication terminates DDoS testing traffic generation autonomously. That is, the specific simulator (such as simulator-A 206A) of the simulators 206 that has lost communication with the simulator controller 204 can terminate DDoS test traffic with an independent decision not requiring communication with the simulator controller 204.

Using multiple locations (geographically dispersed) for DDoS test simulators 206 is helpful due to the fact that DDoS mitigation systems may take into account the geographic location of source traffic and make mitigation decisions based on this geographic location.

The simulator controller 204 is typically used for decision-making and orchestration of the DDoS testing simulators 206. The simulator controller 204 can receive and send signals and updates from and to the monitor controller 200, the simulators 206, and the coordination device 220.

Interaction of Monitor Controller and Monitors

Figure 7:
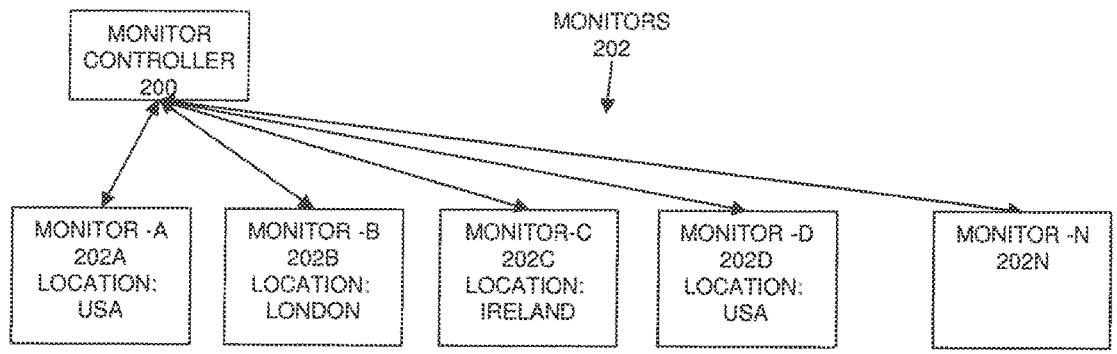
FIG. 7 is a sketch of interaction between the monitor controller and the monitors.

Refer now to FIG. 7, a sketch of interaction between the monitor controller 200 and the monitors 202. The monitor controller 200 controls one or more of the monitors 202 in various locations around the world, for example, monitor-A 202A in the US, monitor-B 202B in London, monitor-C 202C in Ireland, and monitor-D 202D in the US. Distributing the monitors 202 facilitates the monitor controller 200 creating accurate baselines. Because of the nature of DDoS mitigation systems, monitoring during DDoS tests from monitors 202 from multiple locations is important, and may be necessary to create accurate system status baselines, as well as real-time DDoS testing attack termination decision-making. For example, if monitoring were to be setup only from London, and the particular DDoS mitigation system being tested only allows clientele from the US and China to access the organization (internal network 120/services 124), then an incorrect baseline could be generated. In the example, as the DDoS mitigation system does not allow connectivity from the geographic area of the monitor, probes from the monitor in London 206B would be blocked by the DDoS mitigation system 230, the London monitor 202B would fail to respond, and an incorrect baseline may be generated. Another example may be that the non-disruptive DDoS testing system knows that during normal time (a time when DDoS testing is not being run) all monitor locations are stable (e.g. US, Europe, Asia). However, when under an HTTP flood (DDoS test), because of various DDoS mitigation 230 mechanisms triggering (and previously seen in other DDoS testing performed), monitors 202 in the US may move to an unhealthy/unstable status (because of the triggered DDoS mitigation 230 mechanism) but other monitors (other than in the US) continue to be in a stable state. This would likely result in a decision being made to terminate the ongoing DDoS attack traffic on the simulators 206 but because this behavior was expected the DDoS testing system can be configured to continue the DDoS testing until completion and not have a terminate action sent to the simulators 206.

The monitor controller 200 has a bidirectional communication channel with the monitors 202. The monitors 202 can send and receive data from the monitor controller 200. The monitor controller 200 can send and receive data from monitors 202, coordination device 220, and the simulator controller 204. As with the simulators 206, the monitors 202 may be configured to stop generating requests towards the monitored services (for example service 124E or web service 124A) if communication with the monitor controller 200 is lost. This decision of a monitor (for example monitor-A 202A of the monitors 202) can be made independently by the monitor 202 (in this example monitor-A 202A.)

Figure 8:
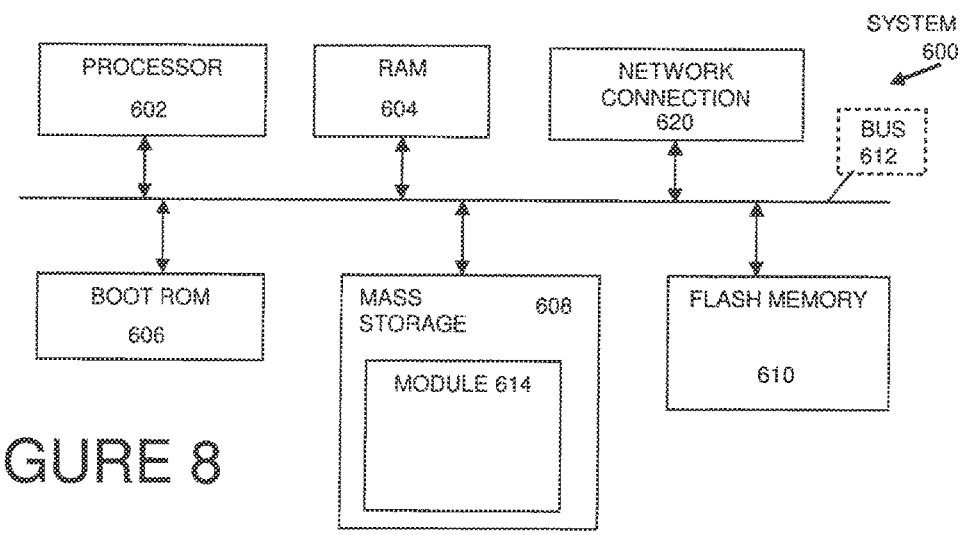
FIG. 8 is a high-level partial block diagram of an exemplary system configured to implement the coordination device.

FIG. 8 is a high-level partial block diagram of an exemplary system 600 configured to implement the coordination device 220 of the present invention. System (processing system) 600 includes a processor 602 (one or more) and four exemplary memory devices: a RAM 604, a boot ROM 606, a mass storage device (hard disk) 608, and a flash memory 610, all communicating via a common bus 612. As is known in the art, processing and memory can include any computer readable medium storing software and/or firmware and/or any hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used in processor 602 including but not limited to reduced instruction set computer (RISC) architecture and/or complex instruction set computer (CISC) architecture. A module (processing module) 614 is shown on mass storage 608, but as will be obvious to one skilled in the art, could be located on any of the memory devices.

Mass storage device 608 is a non-limiting example of a non-transitory computer-readable storage medium bearing computer-readable code for implementing the testing methodology described herein. Other examples of such computer-readable storage media include read-only memories such as CDs bearing such code.

System 600 may have an operating system stored on the memory devices, the ROM may include boot code for the system, and the processor may be configured for executing the boot code to load the operating system to RAM 604, executing the operating system to copy computer-readable code to RAM 604 and execute the code.

Network connection 620 provides communications to and from system 600. Typically, a single network connection provides one or more links, including virtual connections, to other devices on local and/or remote networks. Alternatively, system 600 can include more than one network connection (not shown), each network connection providing one or more links to other devices and/or networks.

System 600 can be implemented as a server or client respectively connected through a network to a client or server.

Note that a variety of implementations for modules and processing are possible, depending on the application. Modules are preferably implemented in software, but can also be implemented in hardware and firmware, on a single processor or distributed processors, at one or more locations. The above-described module functions can be combined and implemented as fewer modules or separated into sub-functions and implemented as a larger number of modules. Based on the above description, one skilled in the art will be able to design an implementation for a specific application.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:
1. A method for testing comprising the steps of:
 (a) configuring a coordination device on a production network, said coordination device emulating at least one network service and said production network protected by a distributed denial of service (DDoS) mitigation module;
 (b) receiving, by said coordination device, pre-attack notification information,
  said pre-attack notification information including:
   one or more types of attacks to be launched; and
 (c) collecting, by said coordination device, operation data regarding the operation of said coordination device, said collecting based on said pre-attack notification information, and said collecting during an attack based on said pre-attack notification information.

2. The method of claim 1 further including the steps of:
(d) monitoring said operation data during said attack; and
(e) if said monitoring determines that said operation data is out of a pre-determined range, initiating notification to alter or terminate said attack.

3. The method of claim 1 further including the steps of:
(d) generating attack results data based on said collecting;
(e) sending said attack results data; and
(f) evaluating said attack results data to determine the effectiveness of said DDoS mitigation module.

4. The method of claim 3 wherein said sending occurs during one or more times selected from the group consisting of:
(i) during said collecting; and
(ii) after said collecting.

5. The method of claim 1 wherein said coordination device is further configured on a mirror port of the production network to receive a copy of network traffic destined for devices on the production network other than said coordination device.

6. The method of claim 1 wherein prior to said step of collecting, generating a baseline of normal response for said at least one network service.

7. The method of claim 1 wherein prior to said step of collecting, verifying stability of the production network.

8. The method of claim 1 wherein said pre-attack notification information includes:
(a) when each type of attack will be launched, and
(b) parameters of each type of attack.

9. The method of claim 1 further including the step of:
(d) configuring one or more coordination agents on one or more devices on the production network, wherein said coordination agents are configured for:
(i) receiving said pre-attack notification information;
(ii) collecting agent operation data regarding the operation of said respective one or more devices on which said coordination agent is configured, said collecting based on said pre-attack notification information, and said collecting during said attack;
(iii) generating agent attack results data based on said collecting; and
(iv) sending said agent attack results data.

10. The method of claim 9 wherein said receiving and said sending by said coordination agents are with a device selected from the group consisting of:
(A) said coordination device;
(B) a monitor; and
(C) a monitor controller.

11. The method of claim 9 further including the steps of:
(e) monitoring said agent operation data during said attack; and
(f) if said monitoring determines that said agent operation data is out of a pre-determined range, initiating notification to alter or terminate said attack.

12. The method of claim 1 further including the step of:
(d) configuring one or more monitor devices on an external network, said external network other than said production network, wherein said monitor devices are configured for:
(i) receiving said pre-attack notification information;
(ii) collecting monitor operation data from a source selected from the group consisting of:
(A) one or more devices on said production network; and
(B) one or more network services on said production network,
said collecting based on said pre-attack notification information, and said collecting during said attack,
(iii) generating monitor attack results data based on said collecting; and
(iv) sending said monitor attack results data.

13. The method of claim 12 further including the steps of:
(e) monitoring said monitor operation data during said attack; and
(f) if said monitoring determines that said monitor operation data is out of a pre-determined range, initiating notification to alter or terminate said attack.

14. The method of claim 1 wherein said attack is initiated by a monitor controller device in communication with a simulator controller, and if said simulator controller loses communication with said monitor controller then said simulator controller initiates notification to terminate said attack.

15. The method of claim 1 wherein said attack is initiated by simulator controller to be performed by one or more simulators, and if any of said simulators loses communication with said simulator controller, then said simulator that has lost communication terminates performing said attack.

16. A system for testing comprising:
(a) a coordination device emulating at least one network service, and configured to:
(i) receive pre-attack notification information, said pre-attack notification information including:
one or more types of attacks to be launched; and
(ii) collect operation data regarding the operation of said coordination device,
wherein said collecting is based on said pre-attack notification information, and said collecting is during an attack based on said pre-attack notification information.

17. The system of claim 16 wherein:
(i) said coordination device is configured on a production network; and
(ii) said production network is protected by a distributed denial of service (DDoS) mitigation module.

18. The system of claim 16 wherein said coordination device is further configured to:
(iii) monitor said operation data during said attack; and
(iv) if said monitoring determines that said operation data is out of a pre-determined range, initiating notification to alter or terminate said attack.

19. The system of claim 17 wherein said coordination device is further configured to:
(iii) generate attack results data based on said collecting;
(iv) send said attack results data; and
(v) evaluate said attack results data to determine the effectiveness of said DDoS mitigation module,
wherein said sending occurs during one or more times selected from the group consisting of:
(A) during said collecting; and
(B) after said collecting.

20. The system of claim 16 wherein said coordination device is further configured to:
(iii) prior to said collecting, generate a baseline of normal response for said at least one network service; and
(iv) prior to said collecting, verify stability of the production network.

21. The system of claim 17 wherein:
(A) said production network includes one or more devices; and
(B) at least one of said one or more devices is configured with one or more coordination agents operable to:
(I) receive said pre-attack notification information;
(II) collect agent operation data regarding the operation of said respective one or more devices on which said coordination agent is configured, said collecting based on said pre-attack notification information, and said collecting during said at tack;

(III) generate agent attack results data based on said collecting; and
(IV) send said agent attack results data.

22. The system of claim 21 wherein said one or more coordination agents are further operable to:
(V) monitor said agent operation data during said attack; and
(VI) if said monitoring determines that said agent operation data is out of a pre-determined range, initiating notification to alter or terminate said attack.

23. The system of claim 16 further including:
(b) an external network, said external network other than said production network,
(c) one or more monitor devices configured on said external network, wherein said monitor devices are operable to:
(i) receive said pre-attack notification information;
(ii) collect monitor operation data from a source selected from the group consisting of:
(A) one or more devices on said production network; and
(B) one or more network services on said production network,
said collecting based on said pre-attack notification information, and said collecting during said attack,
(iii) generate monitor attack results data based on said collecting; and
(iv) send said monitor attack results data.

24. The system of claim 23 wherein said monitor devices are further operable to:
(v) monitor said monitor operation data during said attack; and
(vi) if said monitoring determines that said monitor operation data is out of a pre-determined range, initiating notification to alter or terminate said attack.

25. The system of claim 16 further including:
(b) a simulator controller; and
(c) a monitor controller in operational communication with said coordination device and said simulator controller, said monitor controller operational to:
(i) initiate said attack, and
said simulator controller is operational:
(ii) if said simulator controller loses communication with said monitor controller en said simulator controller initiates notification to terminate said attack.

26. The system of claim 16 wherein said attack is initiated by a simulator controller to be performed by one or more simulators, and if any of said simulators loses communication with said simulator controller, then said simulator that has lost communication terminates performing said attack.

27. The system of claim 16 wherein said pre-attach notification information includes:
(a) when each type of attack will be launched, and
(b) parameters of each type of attack.

28. A non-transitory computer-readable storage medium having embedded thereon computer-readable code for testing, the computer-readable code comprising program code for:
(a) configuring a coordination device on a production network, said coordination device emulating at least one network service and said production network protected by a distributed denial of service (DDoS) mitigation module;
(b) receiving, by said coordination device, pre-attack notification information,
said pre-attack notification information including:
one or more types of attacks to be launched; and
(c) collecting, by said coordination device, operation data regarding the operation of said coordination device, said collecting based on said pre-attack notification information, and said collecting during an attack based on said pre-attack notification information.

* * * * *